United States Patent [19]

Hong

[11] Patent Number: 5,530,486
[45] Date of Patent: Jun. 25, 1996

[54] APPARATUS AND METHOD FOR SEPARATING LUMINANCE AND COLOR SIGNALS FROM INPUT VIDEO SIGNAL

[75] Inventor: Sung H. Hong, Seoul, Rep. of Korea

[73] Assignee: Goldstar Co., Ltd., Seoul, Rep. of Korea

[21] Appl. No.: 285,111

[22] Filed: Aug. 3, 1994

[30] Foreign Application Priority Data

Aug. 6, 1993 [KR] Rep. of Korea ............... 15275/1993

[51] Int. Cl.$^6$ ............... H04N 9/77; H04N 9/78
[52] U.S. Cl. ............ 348/663; 348/664; 348/665; 348/659
[58] Field of Search ............... 348/663, 664, 348/665, 659, 666, 667, 668, 669; H04N 9/77, 9/78

[56] References Cited

U.S. PATENT DOCUMENTS

| | | | |
|---|---|---|---|
| 5,206,715 | 4/1993 | Jung | 348/664 |
| 5,264,923 | 11/1993 | Bhang | 348/665 |
| 5,373,328 | 12/1994 | Hong | 348/668 |

FOREIGN PATENT DOCUMENTS

| | | | |
|---|---|---|---|
| 93284 | 12/1989 | Japan | H04N 9/78 |

*Primary Examiner*—James J. Groody
*Assistant Examiner*—Nina N. West

[57] ABSTRACT

An apparatus and a method for separating luminance and color signals from an input video signal. The apparatus comprises a color signal detector for filtering the input video signal at horizontal, vertical and two-dimensional regions to detect respective color signals therefrom, a control signal generator for discriminating horizontal, vertical and diagonal variations of the input video signal and generating a plurality of control signals in accordance with the discriminated result so that one of the color signals from the color signal detector can be selected, an output selection unit for selecting one of the color signals from the color signal detector in response to the control signals from the control signal generator, a delay matching unit for delaying the input video signal to match its timing with that of the color signal from the output selection unit, and a subtracter for subtracting the color signal from the output selection unit from an output signal from the delay matching unit to output the luminance signal. The apparatus further comprises a postprocessor for maintaining the control signals from the control signal generator consistently and outputting the resultant final control signals to the output selection unit.

14 Claims, 13 Drawing Sheets

FIG.13A

| | ADDRES | | | | | DATA | | |
|---|---|---|---|---|---|---|---|---|
| 0  | 0 | 0 | 0 | 0 | 0 | 0 | 0 | 0 |
| 1  | 0 | 0 | 0 | 0 | 1 | 0 | 0 | 1 |
| 2  | 0 | 0 | 0 | 1 | 0 | 1 | 0 | 0 | 1 |
| 3  | 0 | 0 | 0 | 1 | 1 | 2 | 0 | 1 | 0 |
| 4  | 0 | 0 | 1 | 0 | 0 | 1 | 0 | 0 | 1 |
| 5  | 0 | 0 | 1 | 0 | 1 | 2 | 0 | 1 | 0 |
| 6  | 0 | 0 | 1 | 1 | 0 | 2 | 0 | 1 | 0 |
| 7  | 0 | 0 | 1 | 1 | 1 | 3 | 0 | 1 | 1 |
| 8  | 0 | 1 | 0 | 0 | 0 | 1 | 0 | 0 | 1 |
| 9  | 0 | 1 | 0 | 0 | 1 | 2 | 0 | 1 | 0 |
| 10 | 0 | 1 | 0 | 1 | 0 | 2 | 0 | 1 | 0 |
| 11 | 0 | 1 | 0 | 1 | 1 | 3 | 0 | 1 | 1 |
| 12 | 0 | 1 | 1 | 0 | 0 | 2 | 0 | 1 | 0 |
| 13 | 0 | 1 | 1 | 0 | 1 | 3 | 0 | 1 | 1 |
| 14 | 0 | 1 | 1 | 1 | 0 | 3 | 0 | 1 | 1 |
| 15 | 0 | 1 | 1 | 1 | 1 | 4 | 1 | 0 | 0 |
| 16 | 1 | 0 | 0 | 0 | 0 | 1 | 0 | 0 | 1 |
| 17 | 1 | 0 | 0 | 0 | 1 | 2 | 0 | 1 | 0 |
| 18 | 1 | 0 | 0 | 1 | 0 | 2 | 0 | 1 | 0 |
| 19 | 1 | 0 | 0 | 1 | 1 | 3 | 0 | 1 | 1 |
| 20 | 1 | 0 | 1 | 0 | 0 | 2 | 0 | 1 | 0 |
| 21 | 1 | 0 | 1 | 0 | 1 | 3 | 0 | 1 | 1 |
| 22 | 1 | 0 | 1 | 1 | 0 | 3 | 0 | 1 | 1 |
| 23 | 1 | 0 | 1 | 1 | 1 | 4 | 1 | 0 | 0 |
| 24 | 1 | 1 | 0 | 0 | 0 | 2 | 0 | 1 | 0 |
| 25 | 1 | 1 | 0 | 0 | 1 | 3 | 0 | 1 | 1 |
| 26 | 1 | 1 | 0 | 1 | 0 | 3 | 0 | 1 | 1 |
| 27 | 1 | 1 | 0 | 1 | 1 | 4 | 1 | 0 | 0 |
| 28 | 1 | 1 | 1 | 0 | 0 | 3 | 0 | 1 | 1 |
| 29 | 1 | 1 | 1 | 0 | 1 | 4 | 1 | 0 | 0 |
| 30 | 1 | 1 | 1 | 1 | 0 | 4 | 1 | 0 | 0 |
| 31 | 1 | 1 | 1 | 1 | 1 | 5 | 1 | 0 | 1 |

FIG.13B

| ADDRES | | | | | DATA 1 | DATA 2 |
|---|---|---|---|---|---|---|
| 0 | 0 | 0 | 0 | 0 | 0 | 1 |
| 0 | 0 | 0 | 0 | 1 | 0 | 1 |
| 0 | 0 | 0 | 1 | 0 | 0 | 1 |
| 0 | 0 | 0 | 1 | 1 | 0 | 0 |
| 0 | 0 | 1 | 0 | 0 | 0 | 1 |
| 0 | 0 | 1 | 0 | 1 | 0 | 0 |
| 0 | 0 | 1 | 1 | 0 | 0 | 0 |
| 0 | 0 | 1 | 1 | 1 | 1 | 0 |
| 0 | 1 | 0 | 0 | 0 | 0 | 1 |
| 0 | 1 | 0 | 0 | 1 | 0 | 0 |
| 0 | 1 | 0 | 1 | 0 | 0 | 0 |
| 0 | 1 | 0 | 1 | 1 | 1 | 0 |
| 0 | 1 | 1 | 0 | 0 | 0 | 0 |
| 0 | 1 | 1 | 0 | 1 | 1 | 0 |
| 0 | 1 | 1 | 1 | 0 | 1 | 0 |
| 0 | 1 | 1 | 1 | 1 | 1 | 0 |
| 1 | 0 | 0 | 0 | 0 | 0 | 1 |
| 1 | 0 | 0 | 0 | 1 | 0 | 0 |
| 1 | 0 | 0 | 1 | 0 | 0 | 0 |
| 1 | 0 | 0 | 1 | 1 | 1 | 0 |
| 1 | 0 | 1 | 0 | 0 | 0 | 0 |
| 1 | 0 | 1 | 0 | 1 | 1 | 0 |
| 1 | 0 | 1 | 1 | 0 | 1 | 0 |
| 1 | 0 | 1 | 1 | 1 | 1 | 0 |
| 1 | 1 | 0 | 0 | 0 | 0 | 0 |
| 1 | 1 | 0 | 0 | 1 | 1 | 0 |
| 1 | 1 | 0 | 1 | 0 | 1 | 0 |
| 1 | 1 | 0 | 1 | 1 | 1 | 0 |
| 1 | 1 | 1 | 0 | 0 | 1 | 0 |
| 1 | 1 | 1 | 0 | 1 | 1 | 0 |
| 1 | 1 | 1 | 1 | 0 | 1 | 0 |
| 1 | 1 | 1 | 1 | 1 | 1 | 0 |

APPARATUS AND METHOD FOR SEPARATING LUMINANCE AND COLOR SIGNALS FROM INPUT VIDEO SIGNAL

BACKGROUND OF THE INVENTION

1. Field of the Invention

The present invention relates to an apparatus and a method for separating luminance and color signals from a quadrature modulated video signal in which horizontal, vertical and diagonal variations of the video signal are discriminated and the video signal is line comb filtered, band pass filtered or B2H-filtered in accordance with the discriminated result.

2. Description of the Prior Art

Generally, in a quadrature-modulated color television (TV) system such as, for example, an NTSC system or a PAL system, a color signal C is interleaved in a luminance signal Y in order to efficiently use a limited frequency band width of a video signal.

In such a quadrature-modulated color TV system, a cross luminance phenomenon such as a dot crawling phenomenon and a cross color phenomenon such as a rainbow pattern color spread phenomenon may take place when the luminance and color signals Y and C are not perfectly separated from the video signal.

In order to prevent a degradation in a picture quality due to the cross luminance phenomenon and the cross color phenomenon, a conventional luminance/color signal separation apparatus comprises a line comb filter and/or a band pass filter (or a band rejection filter) using a manner in which, when color signals I and Q are sampled every line at a frequency (4 fsc) of four times that of a color subcarrier, the sampled color signals I and Q are 180°-inverted in phase every two samples.

Namely, as shown in FIG. 1 which is a view illustrating a two-dimensional array of the video signal in a general NTSC system, the luminance and color signals Y and C are inverted in phase every line (. . . , Ln–1, Ln, Ln+1, . . .) and every two samples in the same line. FIGS. 2 and 3 are block diagrams of conventional luminance/color signal separation apparatus. The conventional luminance/color signal separation apparatus of FIG. 2 comprises a band pass filter or a 2H-line comb filter to separate the luminance and color signals from the video signal using the manner of FIG. 1. The conventional luminance/color signal separation apparatus of FIG. 3 comprises a two-dimensional filter (line comb filter+band pass filter) B2H to detect the color signal from the video signal and subtract the detected color signal from the video signal delay-matched, so as to detect the luminance signal with an increased resolution.

Referring to FIG. 2, the conventional luminance/color signal separation apparatus comprises delays 1 and 2 for delaying sequentially an input video signal VIDEO IN, amplifiers 3 and 4 for amplifying the input video signal VIDEO IN and an output signal from the delay 2, respectively, an adder 5 for adding output signals from the delay 1 and the amplifiers 3 and 4, an amplifier 6 for amplifying an output signal from the adder 5 to output the color signal C, a delay matching unit 7 for delaying the output signal from the delay 1 to match its timing with that of the color signal C from the amplifier 6, and a subtracter 8 for subtracting the color signal C from the amplifier 6 from an output signal from the delay matching unit 7 to output the luminance signal Y.

Here, the luminance/color signals are separated from the video signal by the 2H-line comb filtering when a delay period of the delays 1 and 2 is a 1H-line scanning interval, verses by the band pass filtering when the delay period of the delays 1 and 2 is two samples.

The operation of the conventional luminance/color signal separation apparatus with the above-mentioned construction will hereinafter be described with reference to FIG. 1.

In the case where the input video signal VIDEO IN is sampled at the frequency of 4 fsc and processed by the 2H-line comb filter, the delay 1 outputs a sample e by delaying a sample b of the input video signal VIDEO IN by one line and the delay 2 outputs a sample h by delaying the sample e from the delay 1 by one line. The amplifiers 3 and 4 amplify the sample b of the input video signal VIDEO IN and the sample h from the delay by 2 and –½, respectively. The adder 5 adds the output signals from the amplifiers 3 and 4 and the sample e from the delay 1. The amplifier 6 amplifies the output signal from the adder 5 by –½.

As a result, the separation of the color signal C is performed by signal-processing the samples b, e and h of the video signal on the basis of an equation of ½×e −¼×(b+h). Then, the delay matching unit 7 matches the timing of the sample e from the delay 1 with that of the color signal C from the amplifier 6. The subtracter 8 subtracts the color signal C from the amplifier 6 from the output signal from the delay matching unit 7, resulting in the separation of the luminance signal Y.

However, in the above-mentioned case where the luminance and color signals are separated from the video signal by the line comb filter, a cross luminance phenomenon such as a dot hanging phenomenon and a cross color phenomenon such as a rainbow pattern color spread phenomenon may take place when the video signal has a vertical or diagonal variation. Also in this case, the luminance signal is reduced in resolution.

On the other hand, in the case where the input video signal VIDEO IN is sampled at the frequency of 4 fsc and processed by the band pass filter, the delay 1 outputs the sample e by delaying a sample d of the input video signal VIDEO IN by two samples and the delay 2 outputs a sample f by delaying the sample e from the delay 1 by two samples. The amplifiers 3 and 4 amplify the sample d of the input video signal VIDEO IN and the sample f from the delay 2 by –½, respectively. The adder 5 adds the output signals from the amplifiers 3 and 4 and the sample e from the delay 1. The amplifier 6 amplifies the output signal from the adder 5 by –½.

As a result, the separation of the color signal C is performed by signal-processing the samples d, e and f of the video signal on the basis of an equation of ½×e−¼×(d+ f). Then, the delay matching unit 7 matches the timing of the sample e from the delay 1 with that of the color signal C from the amplifier 6. The subtracter 8 subtracts the color signal C from the amplifier 6 from the output signal from the delay matching unit 7, resulting in the separation of the luminance signal Y.

However, in the above-mentioned case where the luminance and color signals are separated from the video signal by the band pass filter, a cross luminance phenomenon such as a dot crawling phenomenon and the cross color phenomenon such as the rainbow pattern color spread phenomenon may take place when the video signal has a horizontal or diagonal variation. Also in this case, the luminance signal is reduced in resolution.

Referring to FIG. 3, the conventional luminance/color signal separation apparatus comprises a B2H circuit for separating the color signal C from the input video signal VIDEO IN. The B2H circuit is provided with a line comb filter 9 and a band pass filter 10 connected in series to the line comb filter 9. A subtracter 12 subtracts the separated color signal C from the input video signal delay-matched by a delay matching unit 11, resulting in the separation of the luminance signal Y.

However, in the above-mentioned conventional luminance/color signal separation apparatus employing the B2H circuit it is desirable to increase the resolution of the luminance signal and reduce the cross color phenomenon as compared with the conventional luminance/color signal separation apparatus of FIG. 2, but thus has a disadvantage in that the cross luminance phenomenon such as the dot crawling phenomenon and the dot hanging phenomenon is significantly increased when the video signal has the horizontal or vertical variation.

SUMMARY OF THE INVENTION

Therefore, the present invention has been made in view of the above problems. It is an object of the present invention to provide an apparatus and a method for separating luminance and color signals from an input video signal in which horizontal, vertical and diagonal variations of the video signal are discriminated and the video signal is vertically line comb filtered when it has a horizontal variation, horizontally band pass filtered when it has a vertical variation, and B2H-filtered when it has a diagonal variation or no variation, in accordance with the discriminated result.

In accordance with one aspect of the present invention, there is provided an apparatus for separating luminance and color signals from an input video signal, comprising color signal detection means for filtering the input video signal at horizontal, vertical and two-dimensional regions to detect respective color signals therefrom; control signal generation means for discriminating horizontal, vertical and diagonal variations of the input video signal and generating a plurality of control signals in accordance with the discriminated result so that one of the color signals from said color signal detection means can be selected; output selection means for selecting one of the color signals from said color signal detection means in response to the control signals from said control signal generation means; delay matching means for delaying the input video signal to match its timing with that of the color signal from said output selection means; and subtraction means for subtracting the color signal from said output selection means from an output signal from said delay matching means to output the luminance signal.

In accordance with another aspect of the present invention, there is provided a method of separating luminance and color signals from an input video signal, comprising the steps of (a) delaying horizontally and vertically the input video signal to obtain adjacent samples thereof; (b) performing operational and comparative-processes with respect to the samples obtained at said step (a) to discriminate horizontal, vertical and diagonal variations of the input video signal; (c) line comb filtering, band pass filtering and B2H-filtering the samples obtained at said step (a), respectively, to detect a line comb filtered color signal, a band pass filtered color signal and a line comb filtered and band pass filtered color signal from the input video signal; (d) selecting one of the line comb filtered color signal, the band pass filtered color signal and the line comb filtered and band pass filtered color signal detected at said step (c) in accordance with the result discriminated at said step (b); and (e) subtracting the color signal selected at said step (d) from the input video signal to detect the luminance signal.

BRIEF DESCRIPTION OF THE DRAWINGS

The above and other objects, features and advantages of the present invention will be more clearly understood from the following detailed description taken in conjunction with the accompanying drawings, in which:

FIGS. 13A and 13B are views illustrating ROM data tables in accordance with the present invention.

DETAILED DESCRIPTION OF THE PREFERRED EMBODIMENTS

Figure 4:
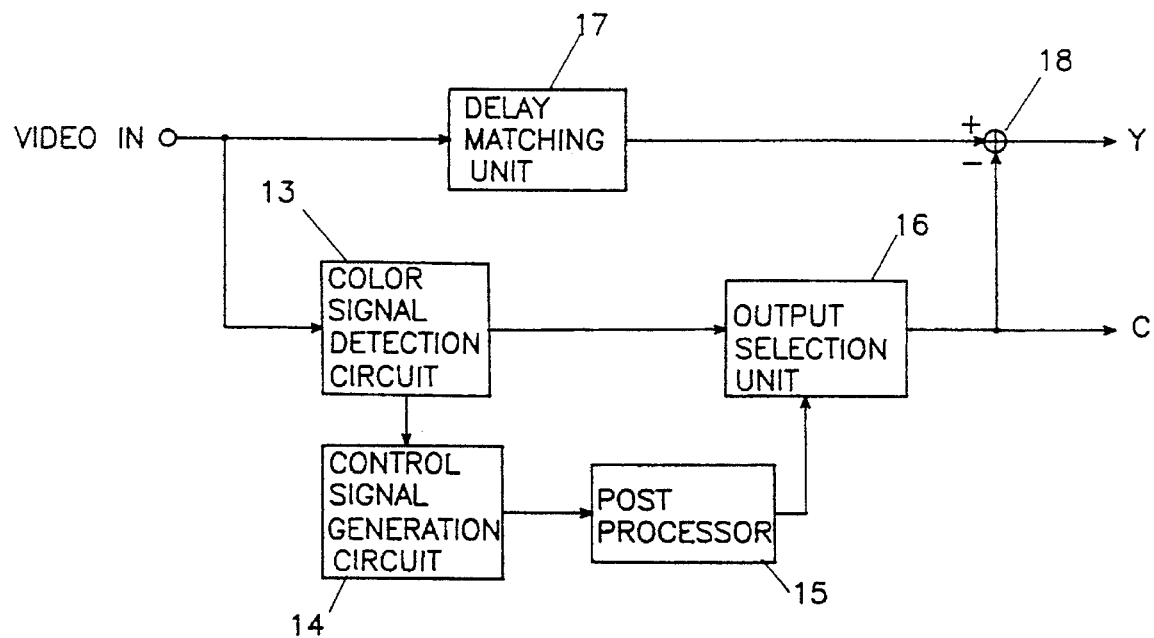
FIG. 4 is a block diagram of an apparatus for separating luminance and color signals from an input video signal in accordance with the present invention.

Referring to FIG. 4, there is shown a block diagram of an apparatus for separating luminance and color signals from an input video signal in accordance with the present invention. As shown in this drawing, the luminance/color signal separation apparatus comprises a color signal detection circuit 13 for filtering the input video signal at horizontal, vertical and two-dimensional regions to detect respective color signals therefrom, a control signal generation circuit 14 for discriminating horizontal, vertical and diagonal variations of the input video signal and generating a plurality of control signals in accordance with the discriminated result so that one of the color signals from the color signal detection circuit 13 can be selected, a post-processor 15 for maintaining the control signals from the control signal generation circuit 14 consistently and outputting the resultant final control signals, an output selection unit 16 for selecting one of the color signals from the color signal detection circuit 13 in response to the final control signals from the post-processor 15, a delay matching unit 17 for delaying the input video signal to match its timing with that of the color signal from the output selection unit 16, and a subtracter 18 for subtracting the color signal from the output selection unit 16 from an output signal from the delay matching unit 17 to output a luminance signal.

The operation of the luminance/color signal separation apparatus with the above-mentioned construction in accordance with the present invention will hereinafter be described in detail.

Figure 1:
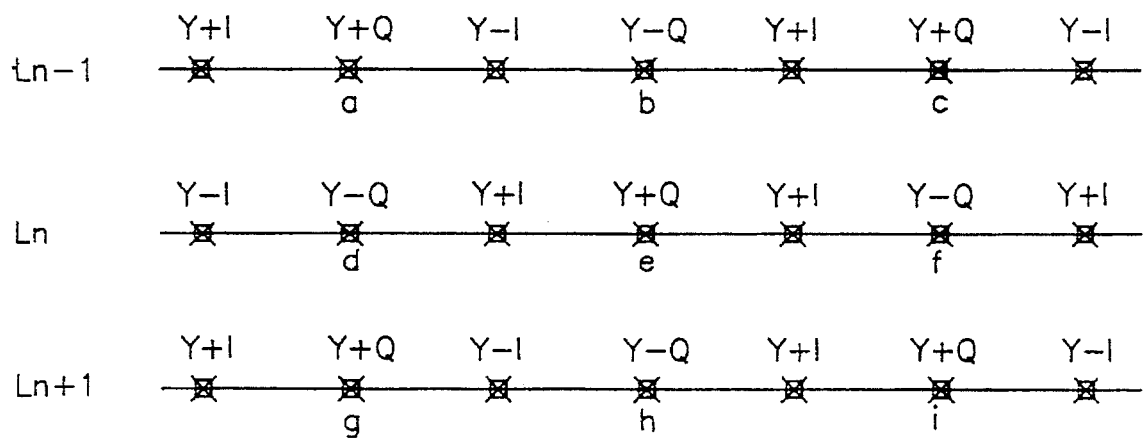
FIG. 1 is a view illustrating a two-dimensional array of a video signal in a general NTSC system.
Figure 2:
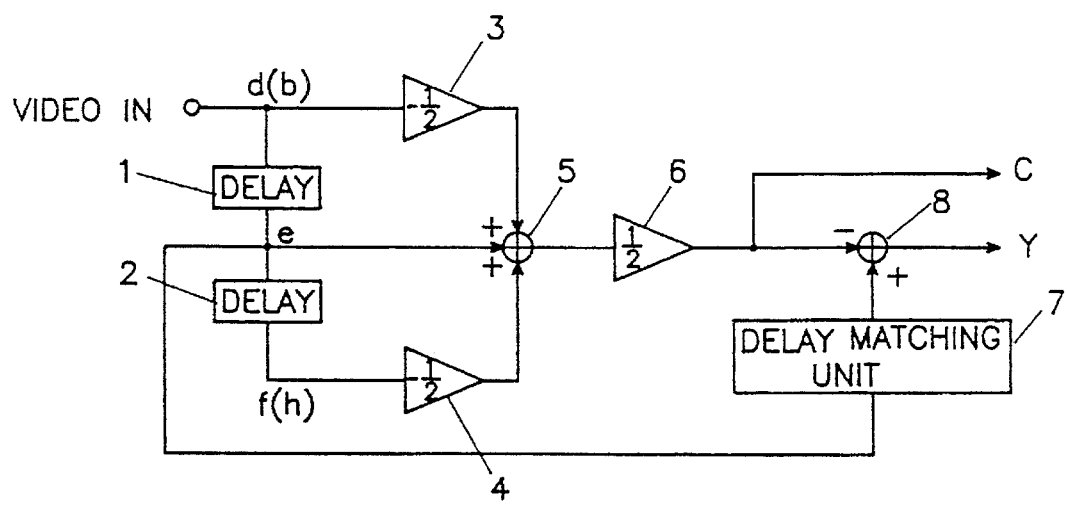
FIG. 2 is a block diagram of a conventional luminance/color signal separation apparatus.
Figure 3:
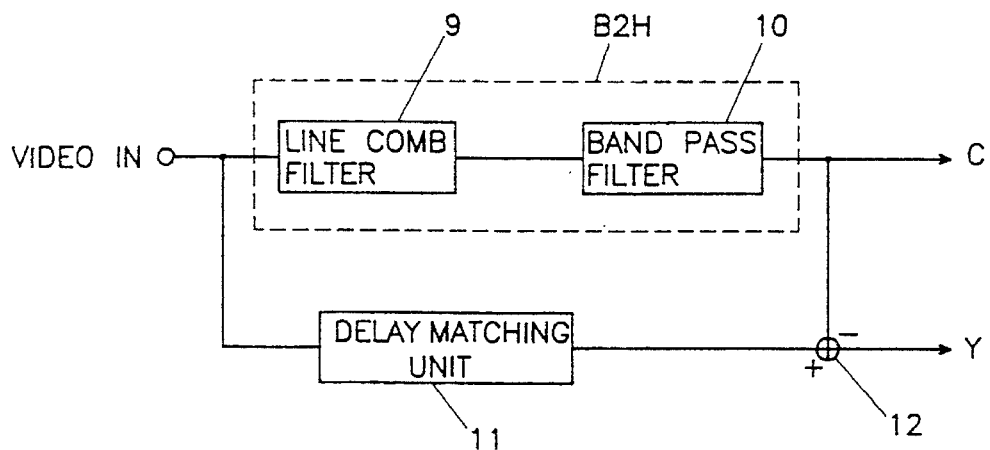
FIG. 3 is a block diagram of another conventional luminance/color signal separation apparatus.

The input video signal VIDEO IN sampled at the frequency of 4 fsc as shown in FIG. 1 is simultaneously applied to the delay matching unit 17 and the color signal detection circuit 13.

The delay matching unit 17 matches the timing of the input video signal VIDEO IN with that of the color signal C from the output selection unit 16 which is applied to the subtracter 18 after being delayed for a predetermined time period by the signal process of the color signal detection circuit 13, the control signal generation circuit 14, the post-processor 15 and the output selection unit 16.

The color signal detection circuit 13 detects the color signals from the input video signal VIDEO IN by performing simultaneously a 2H-line comb filtering process, a band pass filtering process and a B2H (band pass filtering+ comb filtering) process with respect to the input video signal VIDEO IN and outputs the detected color signals to the output selection unit 16.

The control signal generation circuit 14 discriminates the horizontal, vertical and diagonal variations of the input video signal VIDEO IN by performing a comparative analysis with respect to color signal patterns of adjacent samples of the input video signal VIDEO IN and a difference of each pair of the adjacent samples and generates the plurality of control signals in accordance with the discriminated result so that one of the color signals from the color signal detection circuit 13 can be selected. The control signals from the control signal generation circuit 14 are applied to the post-processor 15.

The post-processor 15 maintains the control signals from the control signal generation circuit 14 consistent and then outputs the resultant final control signals to the output selection unit 16 to allow the output selection unit 16 to select one of the color signals from the color signal detection circuit 13.

The output selection unit 16 selects one of the color signals from the color signal detection circuit 13 corresponding to a variation direction of the input video signal VIDEO IN in response to the final control signals from the post-processor 15. When the input video signal VIDEO IN has a horizontal variation, the output selection unit 16 selects the vertically line comb filtered color signal from the color signal detection circuit 13. When the input video signal VIDEO IN has a vertical variation, the output selection unit 16 selects the horizontally band pass filtered color signal from the color signal detection circuit 13. When the input video signal VIDEO IN has a diagonal variation or no variation, the output selection unit 16 selects the B2H-filtered color signal from the color signal detection circuit 13.

The subtracter 18 outputs the luminance signal Y by subtracting the color signal C from the output selection unit 16 from the input video signal delay-matched by the delay matching unit 17.

Figure 5:
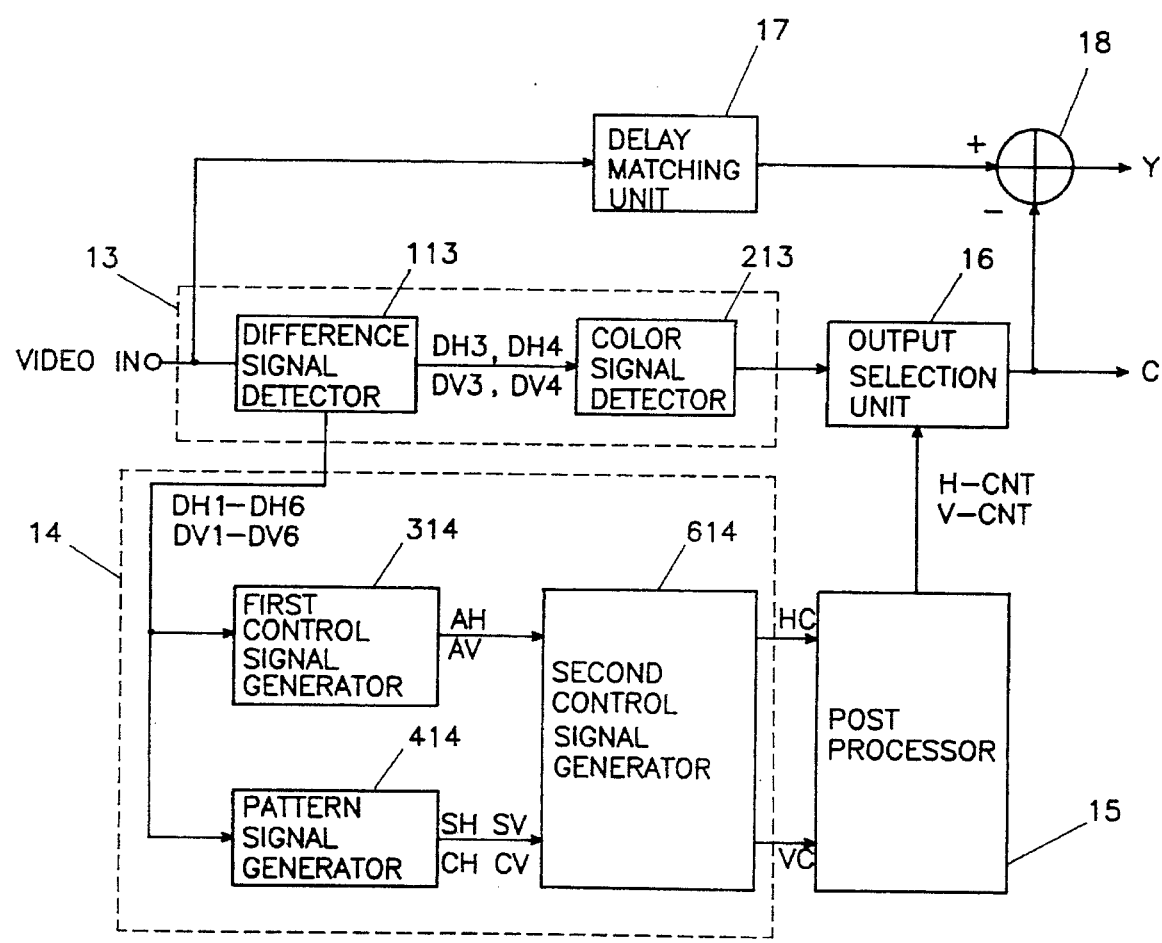
FIG. 5 is a detailed block diagram of a color signal detection circuit and a control signal generation circuit in FIG. 4.

Referring to FIG. 5, there is shown a detailed block diagram of the color signal detection circuit 13 and the control signal generation circuit 14 in FIG. 4. As shown in this drawing, the color signal detection circuit 13 includes a difference signal detector 113 for performing line and sample delay and subtraction processes with respect to the input video signal VIDEO IN to output respective difference signals of the adjacent samples of the input video signal VIDEO IN, and a color signal detector 213 for performing addition, operational-amplification and delay-matching processes with respect to the difference signals from the difference signal detector 113 to output the band pass filtered color signal, the line comb filtered color signal and the B2H-filtered color signal.

The control signal generation circuit 14 includes a first control signal generator 314 for discriminating the horizontal, vertical and diagonal variations of the input video signal VIDEO IN in response to the difference signals from the color signal detection circuit 13 and generating horizontal and vertical selection control signals AH and AV in accordance with the discriminated result, a pattern signal generator 414 for discriminating the horizontal, vertical and diagonal variations of the input video signal VIDEO IN in response to the difference signals from the color signal detection circuit 13 and generating horizontal and vertical control signals CH and CV and horizontal and vertical pattern signals SH and SV in accordance with the discriminated result, and a second control signal generator 614 for generating horizontal and vertical control signals HC and VC in response to the horizontal and vertical selection control signals AH and AV from the first control signal generator 314 and the horizontal and vertical control signals CH and CV and the horizontal and vertical pattern signals SH and SV from the pattern signal generator 414.

The operations of the color signal detection circuit 13 and the control signal generation circuit 14 with the above-mentioned constructions in accordance with the present invention will hereinafter be described in detail with reference to FIG. 5.

In the color signal detection circuit 13, the difference signal detector 113 obtains the adjacent samples of the video signal inputted in the form of the pattern as shown in FIG. 1 and the adjacent samples of the adjacent lines thereof by delaying the input video signal VIDEO IN in the unit of sample and line and outputs horizontal difference signals DH1–DH6 and vertical difference signals DV1–DV6 by performing the subtraction process with respect to the obtained adjacent samples.

The color signal detector 213 performs the addition, operational amplification and delay-matching processes with respect to the horizontal and vertical difference signals DH3, DH4, DV3 and DV4 from the difference signal detector 113 to output the band pass filtered color signal, the line comb filtered color signal and the B2H-filtered color signal.

In the control signal generation circuit 14, the first control signal generator 314 obtains differences between the horizontal difference signals DH1 and DH2, DH3 and DH4 and DH5 and DH6 and differences between the vertical difference signals DV1 and DV2, DV3 and DV4 and DV5 and DV6, takes absolute values of the obtained horizontal and vertical differences, selects a maximum one of the taken horizontal absolute values and a maximum one of the taken vertical absolute values, compares the selected maximum values with predetermined reference values, respectively, and outputs the horizontal and vertical selection control signals AH and AV in accordance with the compared results.

The pattern signal generator 414 discriminates the signal pattern of the input video signal VIDEO IN by taking absolute values of the horizontal and vertical difference signals DH1–DH6 and DV1–DV6 from the difference signal detector 113, comparing the taken absolute values with predetermined reference values, respectively, and logically combining the compared results, and outputs the horizontal and vertical control signals CH and CV and the horizontal and vertical pattern signals SH and SV in accordance with the discriminated result.

The second control signal generator 614 logically combines the horizontal and vertical pattern signals SH and SV from the pattern signal generator 414 and generates the horizontal and vertical control signals HC and VC in accordance with horizontal and vertical pattern relations of the logically combined result and in response to the horizontal and vertical control signals CH and CV from the pattern signal generator 414 and the horizontal and vertical selection control signals AH and AV from the first control signal generator 314. The horizontal and vertical control signals HC and VC from the second control signal generator 614 are applied to the post-processor 15.

The subsequent processes of the post-processor 15, the output selection unit 16, the delay matching unit 17 and the subtracter 18 will be performed as previously stated with reference to FIG. 4.

Figure 6:
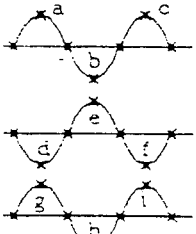
FIG. 6 is a view illustrating signal patterns based on the input video signal in accordance with the present invention.

Referring to FIG. 6, there is shown a view illustrating the signal patterns based on the input video signal VIDEO IN in accordance with the present invention. As shown in this drawing, the horizontal patterns a-b-c, d-e-f and g-h-i and the vertical patterns a-d-g, b-e-h and c-f-i are constant in variation when the input video signal VIDEO IN has no variation.

When the input video signal VIDEO IN has the horizontal variation, the vertical patterns a-d-g, b-e-h and c-f-i have between the adjacent two lines at least one pattern relation which is the same as that in the case where the input video signal VIDEO IN has no variation. Namely, the same pattern relation as that in the case of no variation is present between the vertical patterns a-d-g and b-e-h or the vertical patterns b-e-h and c-f-i.

In the case (not shown) where the input video signal VIDEO IN has the vertical variation, the horizontal patterns a-b-c, d-e-f and g-h-i have between the adjacent samples apart by two samples from each other at least one pattern relation which is the same as that in the case where the input video signal VIDEO IN has no variation. Namely, the same pattern relation as thin in the case of no variation is present between the horizontal patterns a-b-c and d-e-f or the horizontal patterns d-e-f and g-h-i.

The third example of FIG. 6 shows the patters in the case where the input video signal VIDEO IN has the vertical variation among all the three lines and the fourth example shows the patterns in the case where a luminance component of a scanning line to be separated has the horizontal variation when the input video signal VIDEO IN has only the luminance signal.

On the basis of the above-mentioned pattern relations, when the video signal with the luminance and color signals has the horizontal variation (edge variation), the luminance and color signals are accurately separated from the video signal by vertically line comb filtering the video signal. Also, when the video signal with the luminance and color signals has the vertical variation (edge variation), the luminance and color signals are accurately separated from the video signal by band pass filtering the video signal. On the other hand, when the video signal has only the luminance signal, the color signal of very little energy or the diagonal variation, the luminance and color signals are accurately separated from the video signal by B2H-filtering the video signal.

Therefore, the band pass filtering process must be performed in the case of the three-line variation of the video signal and the line comb filtering process must be performed in the case of the successive horizontal variation of the video signal. As seen from the signal pattern of FIG. 1, the discrimination regarding the horizontal variation is performed on the basis of an absolute value ABS[a-c], ABS[d-f] or ABS[g-i] of a difference between left and right adjacent samples apart by two samples from a sample to be separated. The discrimination regarding the vertical variation is performed on the basis of an absolute value ABS[a-g], ABS[b-h] or ABS[c-i] of a difference between samples of upper and lower lines adjacent to a line to be separated.

However, the discrimination regarding the horizontal and vertical variations may not be accurately performed when the video signal has only the luminance signal or the color signal of very little energy. For this reason, according to the present invention, the absolute values and the horizontal and vertical signal pattern relations can be utilized for the horizontal and vertical variation discrimination and the corresponding control signal generation.

Figure 7:
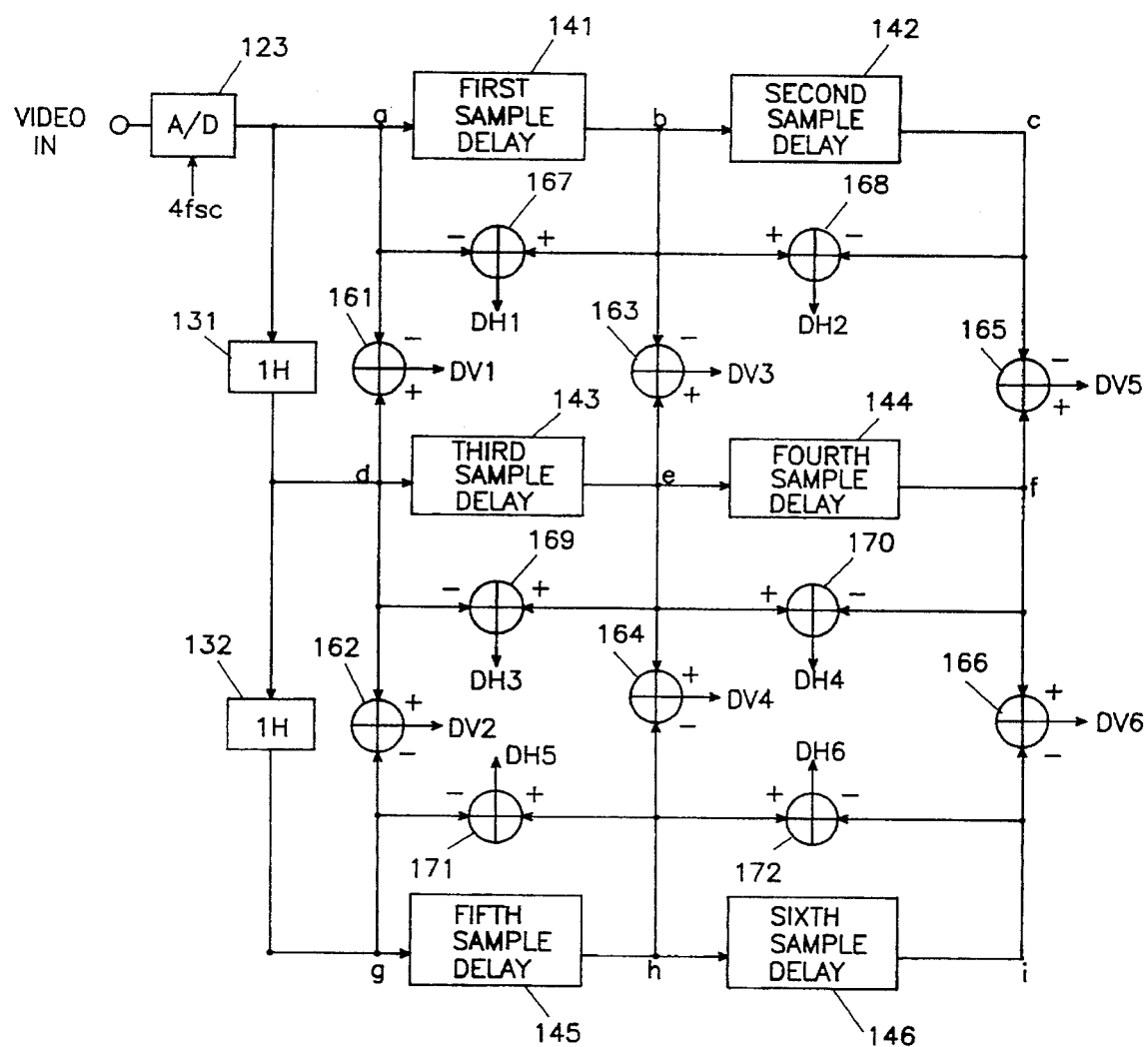
FIG. 7 is a detailed block diagram of a difference signal detector in FIG. 5.

Referring to FIG. 7, there is shown a detailed block diagram of the difference signal detector 113 in FIG. 5. As shown in this drawing, the difference signal detector 113 includes an analog/digital (A/D) converter 123 for convening the analog input video signal VIDEO IN into a digital video signal, first and second horizontal delays 131 and 132 for sequentially delaying an output signal from the A/D converter 123 by one line, first and second sample delays 141 and 142 for sequentially delaying the output signal from the A/D converter 123 by two samples, third and fourth sample delays 143 and 144 for sequentially delaying an output signal from the first horizontal delay 131 by two samples, fifth and sixth sample delays 145 and 146 for sequentially delaying an output signal from the second horizontal delay 132 by two samples, a first subtracter 161 for subtracting the output signal from the A/D converter 123 from the output signal from the first horizontal delay 131 to output the vertical difference signal DV1, a second subtracter 162 for subtracting the output signal from the second horizontal delay 132 from the output signal from the first horizontal delay 131 to output the vertical difference signal DV2, and a third subtracter 163 for subtracting an output signal from the first sample delay 141 from an output signal from the third sample delay 143 to output the vertical difference signal DV3.

The difference signal detector 113 also includes a fourth subtracter 164 for subtracting an output signal from the fifth sample delay 145 from the output signal from the third sample delay 143 to output the vertical difference signal DV4, a fifth subtracter 165 for subtracting an output signal from the second sample delay 142 from an output signal from the fourth sample delay 144 to output the vertical difference signal DV5, a sixth subtracter 166 for subtracting an output signal from the sixth sample delay 146 from the output signal from the fourth sample delay 144 to output the vertical difference signal DV6, a seventh subtracter 167 for subtracting the output signal from the A/D converter 123 from the output signal from the first sample delay 141 to output the horizontal difference signal DH1, an eighth subtracter 168 for subtracting the output signal from the second sample delay 142 from the output signal from the first sample delay 141 to output the horizontal difference signal DH2, and a ninth subtracter 169 for subtracting the output signal from the first horizontal delay 131 from the output signal from the third sample delay 143 to output the horizontal difference signal DH3.

Also, the difference signal detector 113 includes a tenth subtracter 170 for subtracting the output signal from the fourth sample delay 144 from the output signal from the third sample delay 143 to output the horizontal difference signal DH4, an eleventh subtracter 171 for subtracting the output signal from the second horizontal delay 132 from the output signal from the fifth sample delay 145 to output the horizontal difference signal DH5, and a twelfth subtracter 172 for subtracting the output signal from the sixth sample delay 146 from the output signal from the fifth sample delay 145 to output the horizontal difference signal DH6.

The operation of the difference signal detector 113 with the above-mentioned construction in accordance with the present invention will hereinafter be described in detail with reference to FIG. 1.

The A/D converter 123 outputs digital samples of respective lines (Ln−1, Ln and Ln+1) by digitizing the input video signal VIDEO IN at the sampling frequency of 4 fsc. The digital output sample from the A/D converter 123 is applied to the first sample delay 141 and the first horizontal delay 131.

The first horizontal delay 131 outputs the sample d of the line Ln vertically apart by one line from the sample a of the line Ln−1, applied from the A/D converter 123, by delaying the sample a by horizontal one line (1H). The second horizontal delay 132 outputs the sample g of the line Ln+1 vertically apart by one line from the sample d of the line Ln, applied from the first horizontal delay 131, by delaying the sample d by 1H.

The first sample delay 141 outputs the sample b apart by two samples from the output sample a from the A/D converter 123 by delaying the sample a by two samples. The second sample delay 142 outputs the sample c apart by two samples from the output sample b from the first sample delay 141 by delaying the sample b by two samples.

The third sample delay 143 outputs the sample e apart by two samples from the output sample d from the first horizontal delay 131 by delaying the sample d by two samples. The fourth sample delay 144 outputs the sample f apart by two samples from the output sample e from the third sample delay 143 by delaying the sample e by two samples. The fifth sample delay 145 outputs the sample h apart by two samples from the output sample g from the second horizontal delay 132 by delaying the sample g by two samples. The sixth sample delay 146 outputs the sample i apart by two samples from the output sample h from the fifth sample delay 145 by delaying the sample h by two samples.

Namely, the horizontally two-sample-apart samples and the vertically one-line-apart samples are obtained by the delay process of the first and second horizontal delays 131 and 132 and the first to sixth sample delays 141–146.

On the other hand, the first subtracter 161 subtracts the vertically adjacent samples a and d from each other to output the vertical difference signal DV1 (d-a). The second subtracter 162 subtracts the vertically adjacent samples d and g from each other to output the vertical difference signal DV2 (d-g). The third subtracter 163 subtracts the vertically adjacent samples b and e from each other to output the vertical difference signal DV3 (e-b). The fourth subtracter 164 subtracts the vertically adjacent samples e and h from each other to output the vertical difference signal DV4 (e-h). The fifth subtracter 165 subtracts the vertically adjacent samples c and f from each other to output the vertical difference signal DV5 (f-c). The sixth subtracter 166 subtracts the vertically adjacent samples f and i from each other to output the vertical difference signal DV6 (f-i).

The seventh subtracter 167 subtracts the horizontally adjacent samples a and b from each other to output the horizontal difference signal DH1 (b-a). The eighth subtracter 168 subtracts the horizontally adjacent samples b and c from each other to output the horizontal difference signal DH2 (b-c). The ninth subtracter 169 subtracts the horizontally adjacent samples d and e from each other to output the horizontal difference signal DH3 (e-d). The tenth subtracter 170 subtracts the horizontally adjacent samples e and f from each other to output the horizontal difference signal DH4 (e-f). The eleventh subtracter 171 subtracts the horizontally adjacent samples g and h from each other to output the horizontal difference signal DH5 (h-g). The twelfth subtracter 172 subtracts the horizontally adjacent samples h and i from each other to output the horizontal difference signal DH6 (h-i).

The horizontal difference signals DH3 and DH4 and the vertical difference signals DV3 and DV4 from the difference signal detector 113 are applied to the color signal detector 213.

Figure 8:
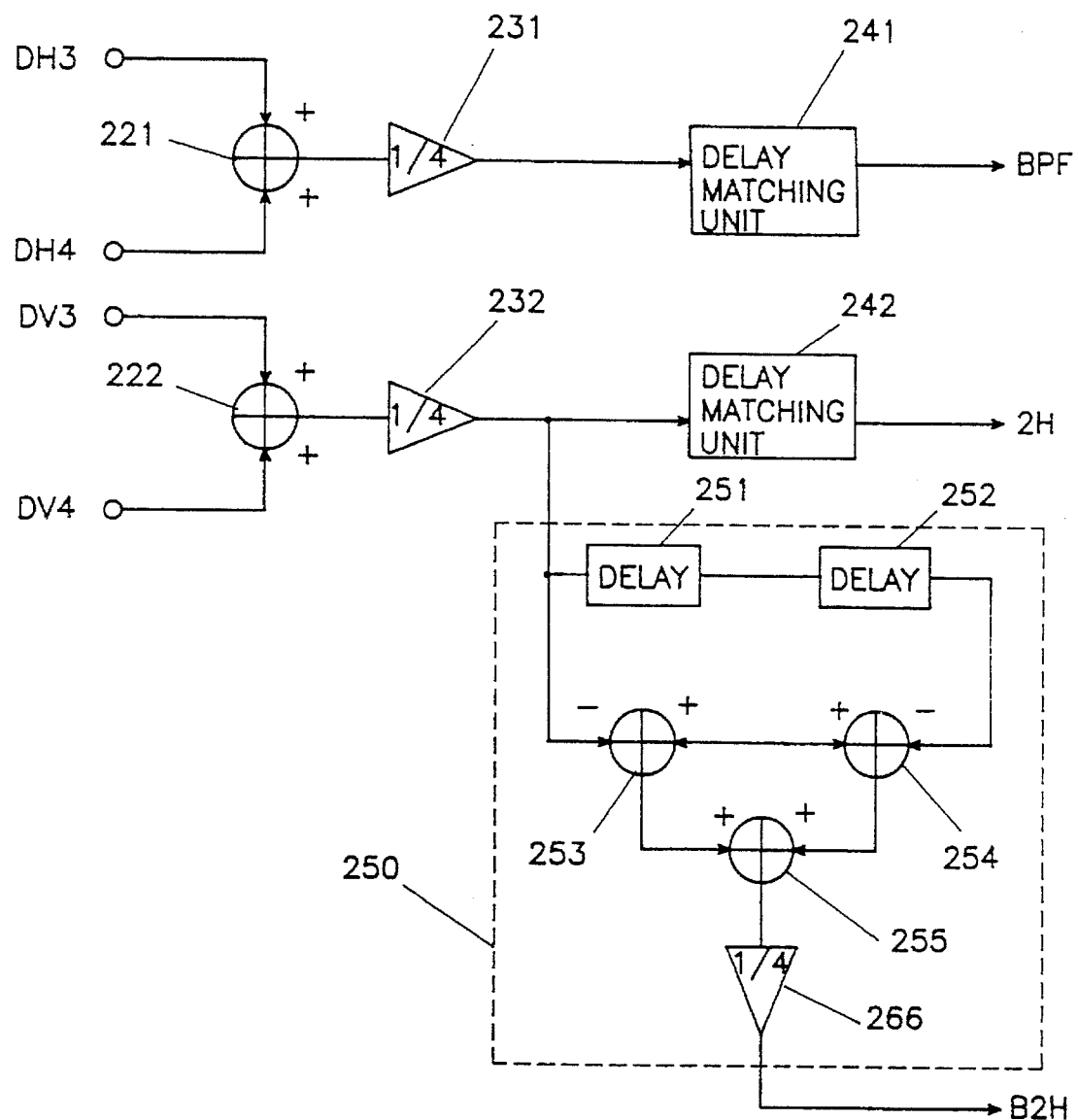
FIG. 8 is a detailed block diagram of a color signal detector in FIG. 5.

Referring to FIG. 8, there is shown a detailed block diagram of the color signal detector 213 in FIG. 5. As shown in this drawing, the color signal detector 213 includes a first adder 221 for adding the horizontal difference signals DH3 and DH4 from the difference signal detector 113, a second adder 222 for adding the vertical difference signals DV3 and DV4 from the difference signal detector 113, first and second amplifiers for operational-amplifying output signals from the first and second adders 221 and 222 by ¼, respectively, a band pass filter 250 for band pass filtering an output signal from the second amplifier 232, and first and second delay matching units 241 and 242 for delaying an output signal frown the first amplifier 231 and the output signal from the second amplifier 232 to match their timing with that of an output signal from the band pass filter 250.

The band pass filter 250 includes first and second delays 251 and 252 for sequentially delaying the output signal from the second amplifier 232 by two samples, a first subtracter 253 for subtracting the output signal from the second amplifier 232 from an output signal from the first delay 251, a second subtracter 254 for subtracting an output signal from the second delay 252 from the output signal from the first delay 251, a third adder 255 for adding output signals from the first and second subtracters 253 and 254, and a third amplifier 256 for operational-amplifying an output signal from the third adder 255 by ¼.

The operation of the color signal detector 213 with the above-mentioned construction in accordance with the present invention will hereinafter be described in detail.

First, the horizontal difference signals DH3 and DH4 and the vertical difference signals DV3 and DV4 from the difference signal detector 113 concerned with the center video signal component e in FIG. 7 are applied to the color signal detector 213.

In the color signal detector 213, the horizontal difference signals DH3 and DH4 from the difference signal detector 113 are added by the first adder 221, amplified by ¼ by the first amplifier 231 and then outputted as the band pass filtered signal BPF through the delay matching unit 241. Namely, BPF=(DH3+ DH4)/4={(e−d)+(e−f)}/ 4=e/2=(e+f)/4

The vertical difference signals DV3 and DV4 from the difference signal detector 113 are added by the second adder 222, amplified by ¼ by the second amplifier 232 and then outputted as the 2H-line comb filtered signal 2H through the delay matching unit 242. Namely, $$2H=(DV3+DV4)/4=\{(e-b)+(e-h)\}/4=e/2-(b+h)/4$$

The line comb filtered signal 2H from the second amplifier 232 is also band pass filtered by the band pass filter 250. Namely, the band pass filter 250 outputs the line comb filtered+ band pass filtered signal B2H.

Then, the line comb filtered signal 2H, the band pass filtered signal BPF and the 2H+BPF-processed signal B2H from the color signal detector 213 are applied to the output selection unit 16.

Figure 9:
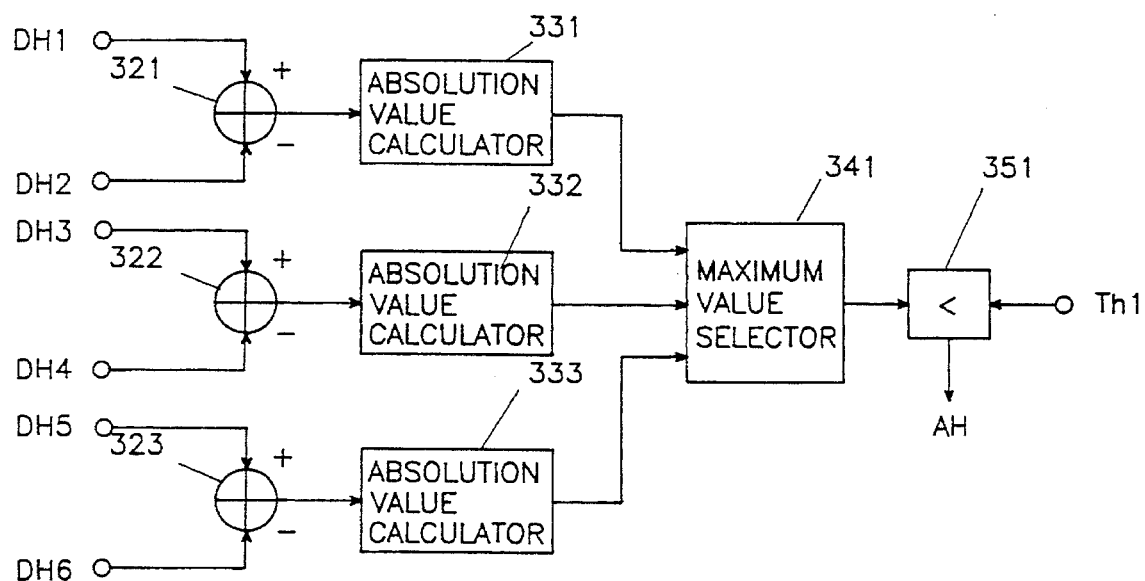
FIG. 9 is a detailed block diagram of a first control signal generator in FIG. 5 as 14.
Figure 9:
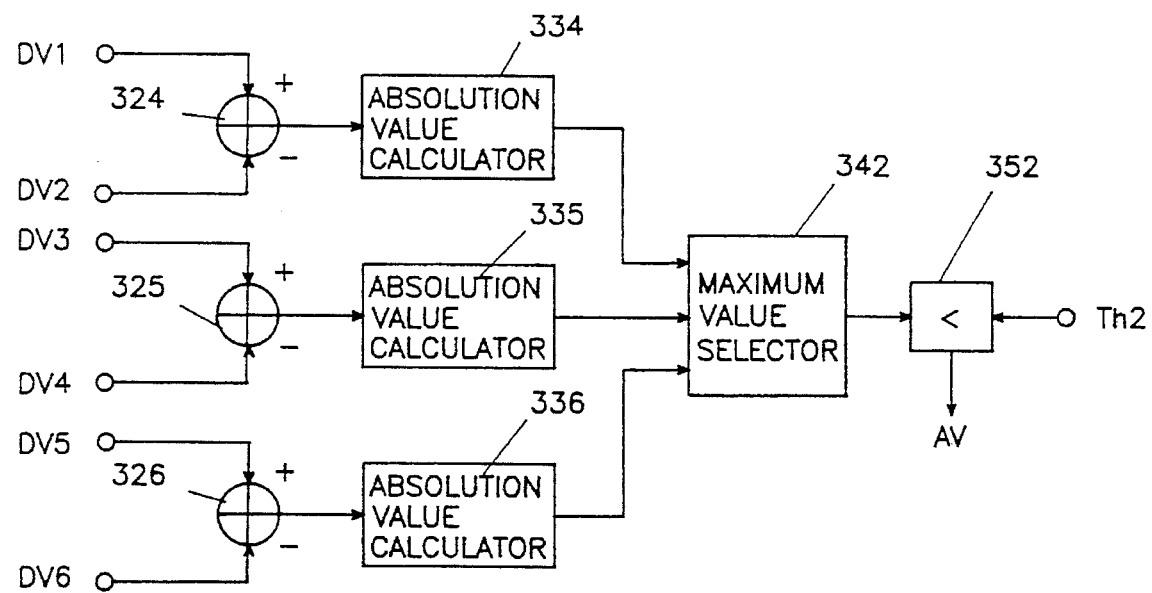

Referring to FIG. 9, there is shown a detailed block diagram of the first control signal generator 314 in the control signal generation circuit 14 in FIG. 5. The first control signal generator 314 generates the horizontal and vertical selection control signals AH and AV by performing the signal process on the basis of the following conditions:

if MAX(ABS($a-c$), ABS($d-f$), ABS($g-i$))<Th1, AH= HIGH, and if MAX(ABS($a-g$), ABS($b-h$), ABS($c-i$))<Th2, AV= HIGH where, MAX: maximum value, ABS: absolute value, and Th1 and Th2: reference values (preferably, 10 and 12 may be obtained experimentally as proper values for Th1 and Th2, respectively).

Alternatively, the first control signal generator 314 generates the horizontal and vertical selection control signals AH and AV by performing the signal process on the basis of the following conditions:

if ABS($d-f$)<Th1, AH= HIGH, and if ABS($b-h$)<Th2, AV= HIGH.

To perform the above signal process, the first control signal generator 314 includes a first subtracter 321 for subtracting the horizontal difference signals DH1 and DH2 from the difference signal detector 113 from each other, a second subtracter 322 for subtracting the horizontal difference signals DH3 and DH4 from the difference signal detector 113 from each other, a third subtracter 323 for subtracting the horizontal difference signals DH5 and DH6 from the difference signal detector 113 from each other, first to third absolute value calculators 331–333 for obtaining absolute values of output signals from the first to third subtracters 321–323, respectively, a first maximum value selector 341 for selecting a maximum one of output values from the first to third absolute value calculators 331–333, and a first comparator 351 for comparing an output value from the first maximum value selector 341 with the reference value Th1 and outputting the horizontal selection control signal AH in accordance with the compared result.

The first control signal generator 314 also includes a fourth subtracter 324 for subtracting the vertical difference signals DV1 and DV2 from the difference signal detector 113 from each other, a fifth subtracter 325 for subtracting the vertical difference signals DV3 and DV4 from the difference signal detector 113 from each other, a sixth subtracter 326 for subtracting the vertical difference signals DV5 and DV6 from the difference signal detector 113 from each other, fourth to sixth absolute value calculators 334–336 for obtaining absolute values of output signals from the fourth to sixth subtracters 324–326, respectively, a second maximum value selector 342 for selecting a maximum one of output values from the fourth to sixth absolute value calculators 334–336, and a second comparator 352 for comparing an output value from the second maximum value selector 342 with the reference value Th2 and outputting the vertical selection control signal AV in accordance with the compared result.

The operation of the first control signal generator 314 with the above-mentioned construction in accordance with the present invention will hereinafter be described in detail.

The first subtracter 321 subtracts the horizontal difference signals DH1 and DH2 from the difference signal detector 113 from each other and applies the subtracted result to the first absolute value calculator 331. The first absolute value calculator 331 obtains the absolute value of the subtracted result from the first subtracter 321 and applies the obtained absolute value to the first maximum value selector 341. Namely, the following value is applied to the first maximum value selector 341:

ABS(DH1–DH2)=ABS($c-a$)

The second subtracter 322 subtracts the horizontal difference signals DH3 and DH4 from the difference signal detector 113 from each other and applies the subtracted result to the second absolute value calculator 332. The second absolute value calculator 332 obtains the absolute value of the subtracted result from the second subtracter 322 and applies the obtained absolute value to the first maximum value selector 341. Namely, the following value is applied to the first maximum value selector 341:

ABS(DH3–DH4)=ABS($f-d$)

The third subtracter 323 subtracts the horizontal difference signals DH5 and DH6 from the difference signal detector 113 from each other and applies the subtracted result to the third absolute value calculator 333. The third absolute value calculator 333 obtains the absolute value of the subtracted result from the third subtracter 323 and applies the obtained absolute value to the first maximum value selector 341. Namely, the following value is applied to the first maximum value selector 341:

ABS(DH5–DH6)=ABS($i-g$)

The first maximum value selector 341 selects the maximum one of the output values from the first to third absolute value calculators 331-333 and applies the selected maximum value to the first comparator 351. The first comparator 351 compares the maximum value from the first maximum value selector 341 with the reference value Th1. If the maximum value from the first maximum value selector 341 is smaller than the reference value Th1, the first comparator 351 outputs the horizontal selection control signal AH of a high level. On the contrary, if the maximum value from the first maximum value selector 341 is greater than the reference value Th1, the first comparator 351 outputs the horizontal selection control signal AH of a low level.

On the other hand, the fourth subtracter 324 subtracts the vertical difference signals DV1 and DV2 from the difference signal detector 113 from each other and applies the subtracted result to the fourth absolute value calculator 334. The fourth absolute value calculator 334 obtains the absolute value of the subtracted result from the fourth subtracter 324 and applies the obtained absolute value to the second maximum value selector 342.

The fifth subtracter 325 subtracts the vertical difference signals DV3 and DV4 from the difference signal detector 113 from each other and applies the subtracted result to the fifth absolute value calculator 335. The fifth absolute value calculator 335 obtains the absolute value of the subtracted result from the fifth subtracter 325 and applies the obtained absolute value to the second maximum value selector 342.

The sixth subtracter 326 subtracts the vertical difference signals DV5 and DV6 from the difference signal detector 113 from each other and applies the subtracted result to the sixth absolute value calculator 336. The sixth absolute value calculator 336 obtains the absolute value of the subtracted result from the sixth subtracter 326 and applies the obtained absolute value to the second maximum value selector 342.

Namely, the following values from the fourth to sixth absolute value calculators 334–336 are applied to the second maximum value selector 342:

ABS(DV1–DV2)=ABS($g-a$)

ABS(DV3–DV4)=ABS($h-b$)

ABS(DV5–DV6)=ABS($i-c$)

The second maximum value selector 342 selects the maximum one of the output values from the fourth to sixth absolute value calculators 334–336 and applies the selected maximum value to the second comparator 352. The second comparator 352 compares the maximum value from the second maximum value selector 342 with the reference value Th2. If the maximum value from the second maximum value selector 342 is smaller than the reference value Th2, the second comparator 352 outputs the vertical selection control signal AV of a high level. On the contrary, if the maximum value from the second maximum value selector 342 is greater than the reference value Th2, the second comparator 352 outputs the vertical selection control signal AV of a low level.

Referring to FIGS. 10a–10f there are shown detailed block diagrams of circuitry within the pattern signal generator 414 in FIG. 5. The pattern signal generator 414 generates the horizontal pattern signals SH (SH1, SH2 and SH3) and the vertical pattern signals SV (SV1, SV2 and SV3) by performing signal processing on the basis of the following conditions:

if ABS(b–a)>Th3 & ABS(b–c)>Th3 & (b–a)>0 & (b–c)>0, SH1=1, if ABS(b–a)>Th3 & ABS(b–c)>Th3 & (b–a)<0 & (b–c)<0, SH1=–1, if ABS(b–a)<Th3 & ABS(b–c)<Th3, SH1=0, if ABS(e–d)>Th3 & ABS(e–f)>Th3 & (e–d)>0 & (e–f)>0, SH2=1, if ABS(e–d)>Th3 & ABS(e–f)>Th3 & (e–d)<0 & (e–f)<0, SH2=–1, if ABS(e–d)<Th3 & ABS(e–f)<Th3, SH2=0, if ABS(h–g)>Th3 & ABS(h–i)>Th3 & (h–g)>0 & (h–i)>0, SH3=1, if ABS(h–g)>Th3 & ABS(h–i)>Th3 & (h–g)<0 & (h–i)<0, SH3=–1, if ABS(h–g)<Th3 & ABS(h–i)<Th3, SH3=0, if ABS(d–a)>Th4 & ABS(d–g)>Th4 & (d–a)>0 & (d–g)>0, SV1=1, if ABS(d–a)>Th4 & ABS(d–g)>Th4 & (d–a)<0 & (d–g)<0, SV1=–1, if ABS(d–a)<Th4 & ABS(d–g)<Th4, SV1=0, if ABS(e–b)>Th4 & ABS(e–h)>Th4 & (e–b)>0 & (e–h)>0, SV2=1, if ABS(e–b)>Th4 & ABS(e–h)>Th4 & (e–b)<0 & (e–h)<0, SV2=–1, if ABS(e–b)<Th4 & ABS(e–h)<Th4, SV2=0, if ABS(f–c)>Th4 & ABS(f–i)>Th4 & (f–c)>0 & (f–i)>0, SV3=1, if ABS(f–c)>Th4 & ABS(f–i)>Th4 & (f–c)<0 & (f–i)<0, SV3=–1, and if ABS(f–c)<Th4 & ABS(f–i)<Th4, SV3=0.

The following table 1 shows the significance of the horizontal pattern signals SH1, SH2 and SH3 and the vertical pattern signals SV1, SV2 and SV3 obtained by performing the signal processing on the basis of the above conditions:

TABLE 1

| SH1 | a – b – c | SH2 | d – e – f | SH3 | g – h – i |
|---|---|---|---|---|---|
| 1 | /\ | 1 | /\ | 1 | /\ |
| –1 | \/ | –1 | \/ | –1 | \/ |
| 0 | —— | 0 | —— | 0 | —— |

| SV1 | a – d – g | SV2 | b – e – h | SV3 | c – f – i |
|---|---|---|---|---|---|
| 1 | /\ | 1 | /\ | 1 | /\ |
| –1 | \/ | –1 | \/ | –1 | \/ |
| 0 | —— | 0 | —— | 0 | —— |

To perform the above signal processing, the pattern signal generator 414 includes a first absolute value calculator 401 (FIG. 10a) for obtaining an absolute value of the horizontal difference signal DH1 from the difference signal detector 113, a first comparator 431 for comparing an output value from the first absolute value calculator 401 with the reference value Th3, an inverter 432 for inverting a sign bit of the horizontal difference signal DH1 from the difference signal detector 113, an AND gate 433 for ANDing the sign bit of the horizontal difference signal DH1 from the difference signal detector 113 and an output signal from the first comparator 431, an AND gate 434 for ANDing an output signal from the inverter 432 and the output signal from the first comparator 431, an inverter 435 for inverting the output signal from the first comparator 431, a second absolute value calculator 402 for obtaining an absolute value of the horizontal difference signal DH2 from the difference signal detector 113, a second comparator 436 for comparing an output value from the second absolute value calculator 402 with the reference value Th3, an inverter 437 for inverting a sign bit of the horizontal difference signal DH2 from the difference signal detector 113, an AND gate 438 for ANDing the sign bit of the horizontal difference signal DH2 from the difference signal detector 113 and an output signal from the second comparator 436, an AND gate 439 for ANDing an output signal from the inverter 437 and the output signal from the second comparator 436, an inverter 440 for inverting the output signal from the second comparator 436, an AND gate 441 for ANDing output signals from the AND gates 433 and 438 to output the horizontal pattern signal SH11, an AND gate 442 for ANDing output signals from the AND gates 434 and 439 to output the horizontal pattern signal SH12, an AND gate 443 for ANDing output signals from the inverters 435 and 440 to output the horizontal pattern signal SH13, and an OR gate 444 for ORing output signals from the AND gates 441–443 to output the horizontal control signal CH1.

Figure 10A:
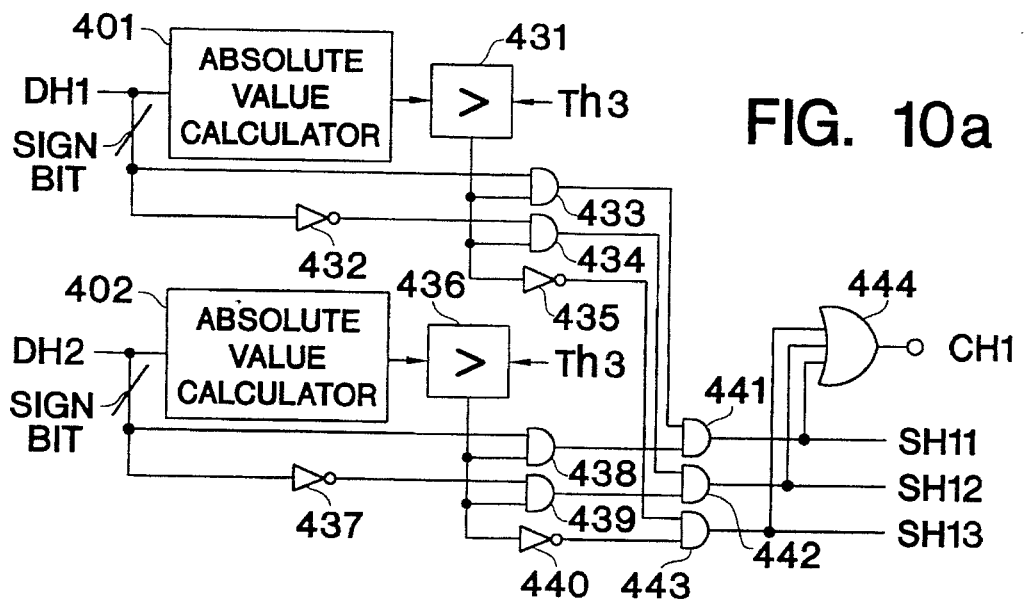
FIGS. 10a–10f are detailed block diagrams of circuitry within pattern signal generator 414 in FIG. 5.
Figure 10B:
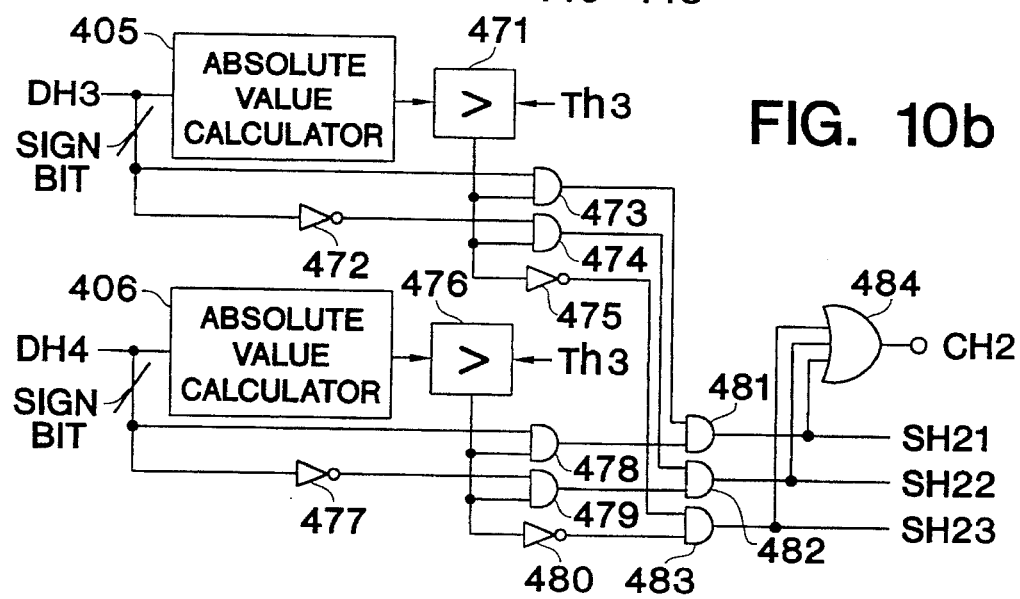

As shown in FIG. 10b, the pattern signal generator 414 further includes the same construction as mentioned above, to input the horizontal difference signals DH3 and DH4 from the difference signal detector 113 and output the horizontal pattern signals SH21, SH22 and SH23 and the horizontal control signal CH2.

Figure 10C:
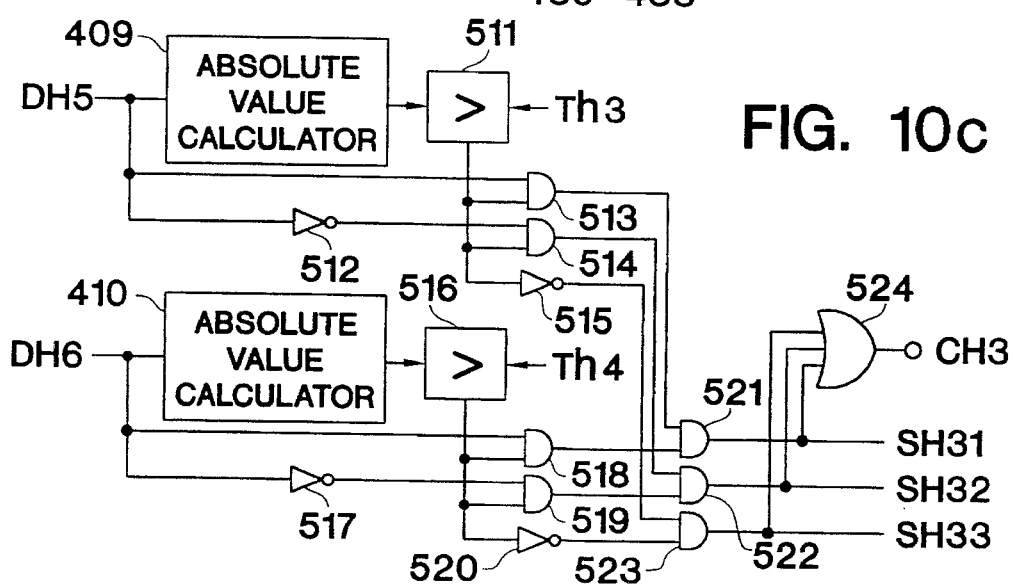
Figure 10D:
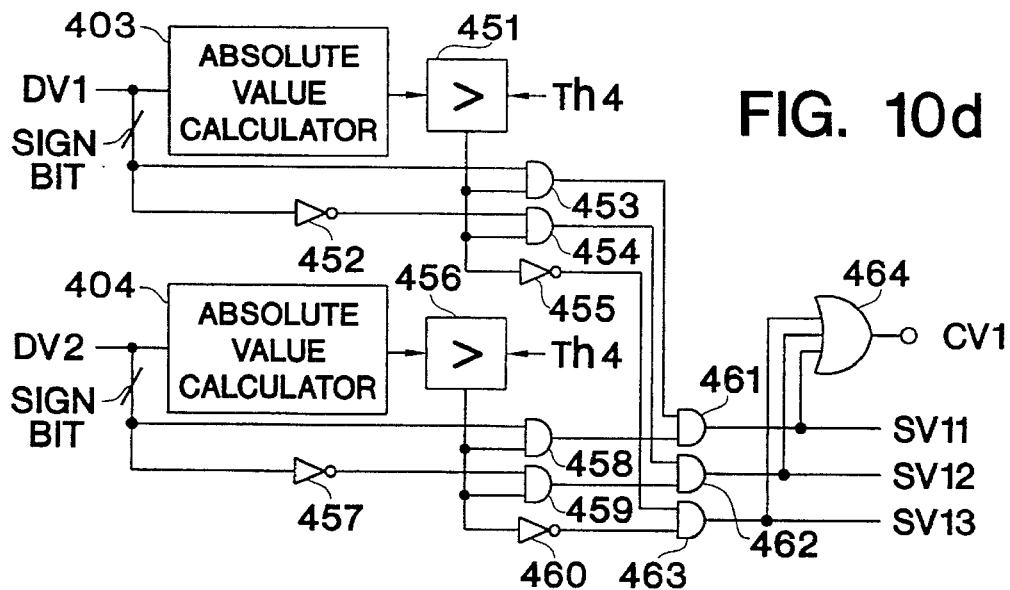

As shown in FIG. 10c, the pattern signal generator 414 further includes the same construction as mentioned above, to input the horizontal difference signals DH5 and DH6 from the difference signal detector 113 and output the horizontal pattern signals SH31, SH32 and SH33 and the horizontal control signal CH3.

Also, the pattern signal generator 414 includes a third absolute value calculator 403 (FIG. 10d) for obtaining an absolute value of the vertical difference signal DV1 from the difference signal detector 113, a third comparator 451 for comparing an output value from the third absolute value calculator 403 with the reference value Th4, an inverter 452 for inverting a sign bit of the vertical difference signal DV1 from the difference signal detector 113, an AND gate 453 for ANDing the sign bit of the vertical difference signal DV1 from the difference signal detector 113 and an output signal from the third comparator 451, an AND gate 454 for ANDing an output signal from the inverter 452 and the output signal from the third comparator 451, an inverter 455 for inverting the output signal from the third comparator 451, a fourth absolute value calculator 404 for obtaining an absolute value of the vertical difference signal DV2 from the difference signal detector 113, a fourth comparator 456 for comparing an output value from the fourth absolute value calculator 404 with the reference value Th4, an inverter 457 for inverting a sign bit of the vertical difference signal DV2 from the difference signal detector 113, an AND gate 458 for ANDing the sign bit of the vertical difference signal DV2 from the difference signal detector 113 and an output signal from the fourth comparator 456, an AND gate 459 for ANDing an output signal from the inverter 457 and the output signal from the fourth comparator 456, an inverter 460 for inverting the output signal from the fourth comparator 456, an AND gate 461 for ANDing output signals from the AND gates 453 and 458 to output the vertical pattern signal SV11, an AND gate 462 for ANDing output signals from the AND gates 454 and 459 to output the vertical pat, tern signal SV12, an AND gate 463 for ANDing output signals from the inverters 455 and 460 to output the vertical pattern signal SV13, and an OR gate 464 for ORing output signals from the AND gates 461–463 to output the vertical control signal CV1.

Figure 10E:
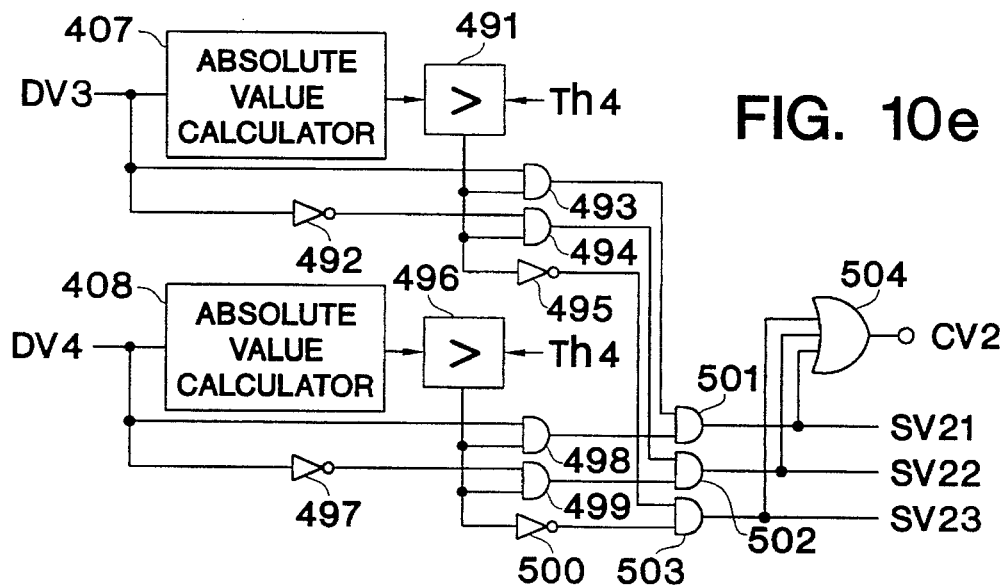

As shown in FIG. 10e, the pattern signal generator 414 further includes the same construction as mentioned above to input the vertical difference signals DV3 and DV4 from the difference signal detector 113 and output the vertical pattern signals SV21, SV22 and SV23 and the vertical control signal CV2.

Figure 10F:
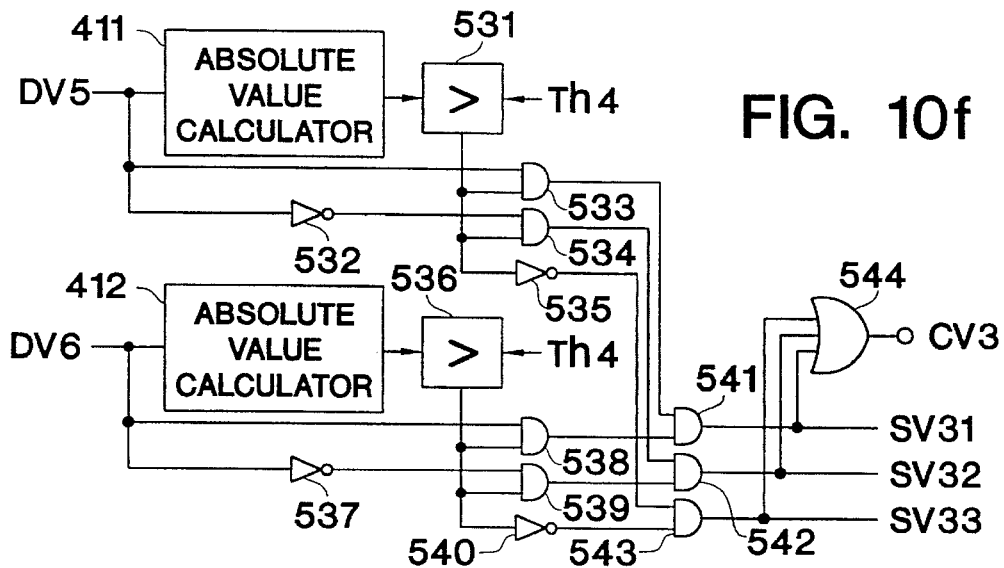

As shown in FIG. 10f the pattern signal generator 414 further includes the same construction as mentioned above, to input the vertical difference signals DV5 and DV6 from the difference signal detector 113 and output the vertical pattern signals SV31, SV32 and SV33 and the vertical control signal CV3.

Preferably, "6" may be obtained experimentally as a proper value for Th3 and Th4.

The operation of the pattern signal generator 414 with the above-mentioned construction in accordance with the present invention will hereinafter be described in detail.

The first absolute value calculator 401 obtains the absolute value ABS(b-a) of the horizontal difference signal DH1 (b-a) from the difference signal detector 113. The first comparator 431 compares the absolute value from the first absolute value calculator 401 with the reference value Th3. If the absolute value from the first absolute value calculator 401 is greater than the reference value Th3, the first comparator 431 provides a high output. On the contrary, if the absolute value from the first absolute value calculator 401 is smaller than the reference value Th3, the first comparator 431 provides a low output.

The second absolute value calculator 402 obtains the absolute value ABS(b-c) of the horizontal difference signal DH2 (b-c) from the difference signal detector 113. The second comparator 436 compares the absolute value from the second absolute value calculator 402 with the reference value Th3. If the absolute value from the second absolute value calculator 402 is greater than the reference value Th3, the second comparator 436 provides a high output. On the contrary, if the absolute value from the second absolute value calculator 402 is smaller than the reference value Th3, the second comparator 436 provides a low output.

Applied to the AND gate 433 and the inverter 432 is the sign bit of the horizontal difference signal DH1 from the difference signal detector 113 which is high if DH1=b-a <0. As a result, it ABS(b-a)>Th3 and b-a<0, the output of the AND gate 433 becomes high. Also, the sign bit of the horizontal difference signal DH1 from the difference signal detector 113 is inverted by the inverter 432 and then applied to the AND gate 434. As a result, if ABS(b-a)>Th3 and b-a>0, the output of the AND gate 434 becomes high. Also, the output signal from the first comparator 431 is applied to the inverter 435. As a result, if ABS(b-a)<Th3, the output of the inverter 435 becomes high.

The sign bit of the horizontal difference signal DH2 from the difference signal detector 113 which is high if DH2=b-c<0 is applied to the AND gate 438 and the inverter 437. As a result, if ABS(b-c)>Th3 and b-c<0, the output of the AND gate 438 becomes high. Also, the sign bit of the horizontal difference signal DH2 from the difference signal detector 113 is inverted by the inverter 437 and then applied to the AND gate 439. As a result, if ABS(b-c)>Th3 and b-c>0, the output of the AND gate 439 becomes high. Also, the output signal from the second comparator 436 is applied to the inverter 440. As a result, if ABS(b-c)<Th3, the output of the inverter 440 becomes high.

Therefore, a high state of the horizontal pattern signal SH11 from the AND gate 441 signifies the pattern of horizontal pattern signal SH1=−1. A high state of the horizontal pattern signal SH12 from the AND gate 442 signifies the pattern of horizontal pattern signal SH1=1. A high state of the horizontal pattern signal SH13 from the AND gate 443 signifies the pattern of horizontal pattern signal SH1=0. On the other hand, if the outputs of the AND gates 441–443 are all low, the horizontal control signal CH1 from the OR gate 444 is low.

The above operation is performed in the same manner with respect to the horizontal difference signals DH3–DH6 and the vertical difference signals DV1–DV6 from the difference signal detector 113 by the third to twelfth absolute calculators 403–411 and 404–412, the third to twelfth comparators 451–531 and 456–536, and the gates 452-532, 453–533, 454–534, 455–535, 457–537, 458–538, 459–539, 460–540, 461–541, 462–542, 463–543 and 464–544. As a result, the pattern signal generator 414 further generates the horizontal pattern signals SH21, SH22, SH23, SH31, SH32 and SH33 and the vertical pattern signals SV21, SV22, SV23, SV31, SV32 and SV33 signifying the patterns of the above table 1, the horizontal control signals CH2 and CH3, and the vertical control signals CV2 and CV3.

Figure 11:
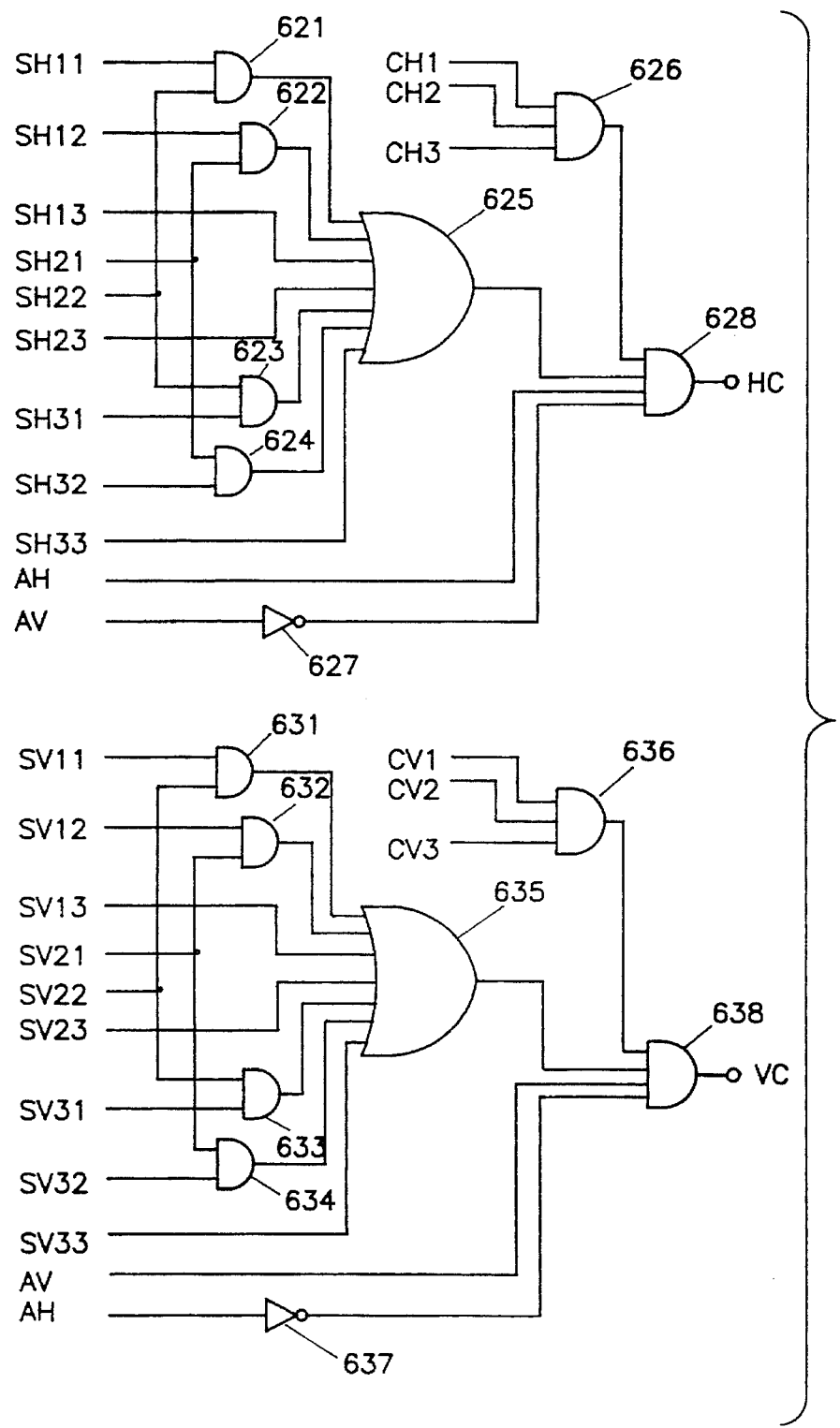
FIG. 11 is a detailed block diagram of a second control signal generator shown in FIG. 5 as 14.

Referring to FIG. 11, there is shown a detailed block diagram of the second control signal generator 614 in FIG. 5. The second control signal generator 614 generates the horizontal and vertical control signals HC and VC by performing the signal process on the basis of the following conditions:

if AH=HIGH & (SH1*SH2≦0 OR SH2*SH3≦0) & CH=HIGH & AV=LOW, HC=HIGH, and if AV=HIGH & (SV1*SV2≦0 OR SV2*SV3≦0) & CV=HIGH & AH=LOW, VC=HIGH where, CH=CH1 & CH2 & CH3, and CV=CV1 & CV2 & CV3.

To perform the above signal process, the second control signal generator 614 includes an AND gate 621 for ANDing the horizontal pattern signals SH11 and SH22 from the pattern signal generator 414, an AND gate 622 for ANDing the horizontal pattern signals SH12 and SH21 from the pattern signal generator 414, an AND gate 623 for ANDing the horizontal pattern signals SH22 and SH31 from the pattern signal generator 414, an AND gate 624 for ANDing the horizontal pattern signals SH21 and SH32 from the pattern signal generator 414, an OR gate 625 for ORing output signals from the AND gates 621-624 and the horizontal pattern signals SH13, SH23 and SH33 from the pattern signal generator 414, an AND gate 626 for ANDing the horizontal control signals CH1–CH3 from the pattern signal generator 414, an inverter 627 for inverting the vertical selection control signal AV from the first control signal generator 314, and an AND gate 628 for ANDing an output signal from the OR gate 625, an output signal from the AND gate 626, an output signal from the inverter 627 and the horizontal selection control signal AH from the first control signal generator 314 to output the horizontal control signal HC.

The second control signal generator 614 also includes an AND gate 631 for ANDing the vertical pattern signals SV11 and SV22 from the pattern signal generator 414, an AND gate 632 for ANDing the vertical pattern signals SV12 and SV21 from the pattern signal generator 414, an AND gate 633 for ANDing the vertical pattern signals SV22 and SV31 from the pattern signal generator 414, an AND gate 634 for ANDing the vertical pattern signals SV21 and SV32 from the pattern signal generator 414, an OR gate 635 for ORing output signals from the AND gates 631–634 and the vertical pattern signals SV13, SV23 and SV33 from the pattern signal generator 414, an AND gate 636 for ANDing the vertical control signals CV1–CV3 from the pattern signal generator 414, an inverter 637 for inverting the horizontal selection control signal AH from the first control signal generator 314, and an AND gate 638 for ANDing an output signal from the OR gate 635, an output signal from the AND gate 636, an output signal from the inverter 637 and the vertical selection control signal AV from the first control signal generator 314 to output the vertical control signal VC.

The operation of the second control signal generator 6 14 with the above-mentioned construction in accordance with the present invention will hereinafter be described in detail.

If the horizontal pattern signal SH1 from the pattern signal generator 414 is −1 and the horizontal pattern signal SH2 from the pattern signal generator 414 is 1, the output of the AND gate 621 is high. This case satisfies the pattern relation of a-b-c and d-e-f in the table 1.

When the horizontal pattern signal SH1 from the pattern signal generator 414 is 1 and the horizontal pattern signal SH2 from the pattern signal generator 414 is −1, the output of the AND gate 622 is high. This case satisfies the corresponding pattern relation in the table 1.

If the horizontal pattern signal SH2 from the pattern signal generator 414 is 1 and the horizontal pattern signal SH3 from the pattern signal generator 414 is −1, the output of the AND gate 623 is high. When the horizontal pattern signal SH2 from the pattern signal generator 414 is −1 and the horizonal pattern signal SH3 from the pattern signal generator 414 is 1, the output of the AND gate 624 is high.

In the case where the horizontal control signal CH (CH1, CH2 and CH3) from the pattern signal generator 414 is high, the output of the AND gate 626 is high. The output HC of the AND gate 628 is high if AH=HIGH & AV=LOW (HIGH inverted by the inverter 627) & CH=HIGH & the output of the OR gate 625=HIGH (SH1 *SH2≦0 OR SH2*SH3≦0).

When the vertical pattern signal SV1 from the pattern signal generator 414 is −1 and the vertical pattern signal SV2 from the pattern signal generator 414 is 1, the output of the AND gate 631 is high. This case satisfies the corresponding pattern relation in the table 1.

If the vertical pattern signal SV1 from the pattern signal generator 414 is 1 and the vertical pattern signal SV2 from the pattern signal generator 414 is −1, the output of the AND gate 632 is high. This case satisfies the corresponding pattern relation in the table 1.

If the vertical pattern signal SV2 from the pattern signal generator 414 is 1 and the vertical pattern signal SV3 from the pattern signal generator 414 is −1, the output of the AND gate 633 is high. When the vertical pattern signal SV2 from the pattern signal generator 414 is −1 and the vertical pattern signal SV3 from the pattern signal generator 414 is 1, the output of the AND gate 634 is high.

In the case where the vertical control signal CV (CV1, CV2 and CV3) from the pattern signal generator 414 is high, the output of the AND gate 636 is high. The output VC of the AND gate 638 is high if AV=HIGH & AH=LOW (HIGH inverted by the inverter 637) & CV=HIGH & the output of the OR gate 635=HIGH (SV1 *SV2≦0 OR SV2*SV3≦0).

Figure 12:
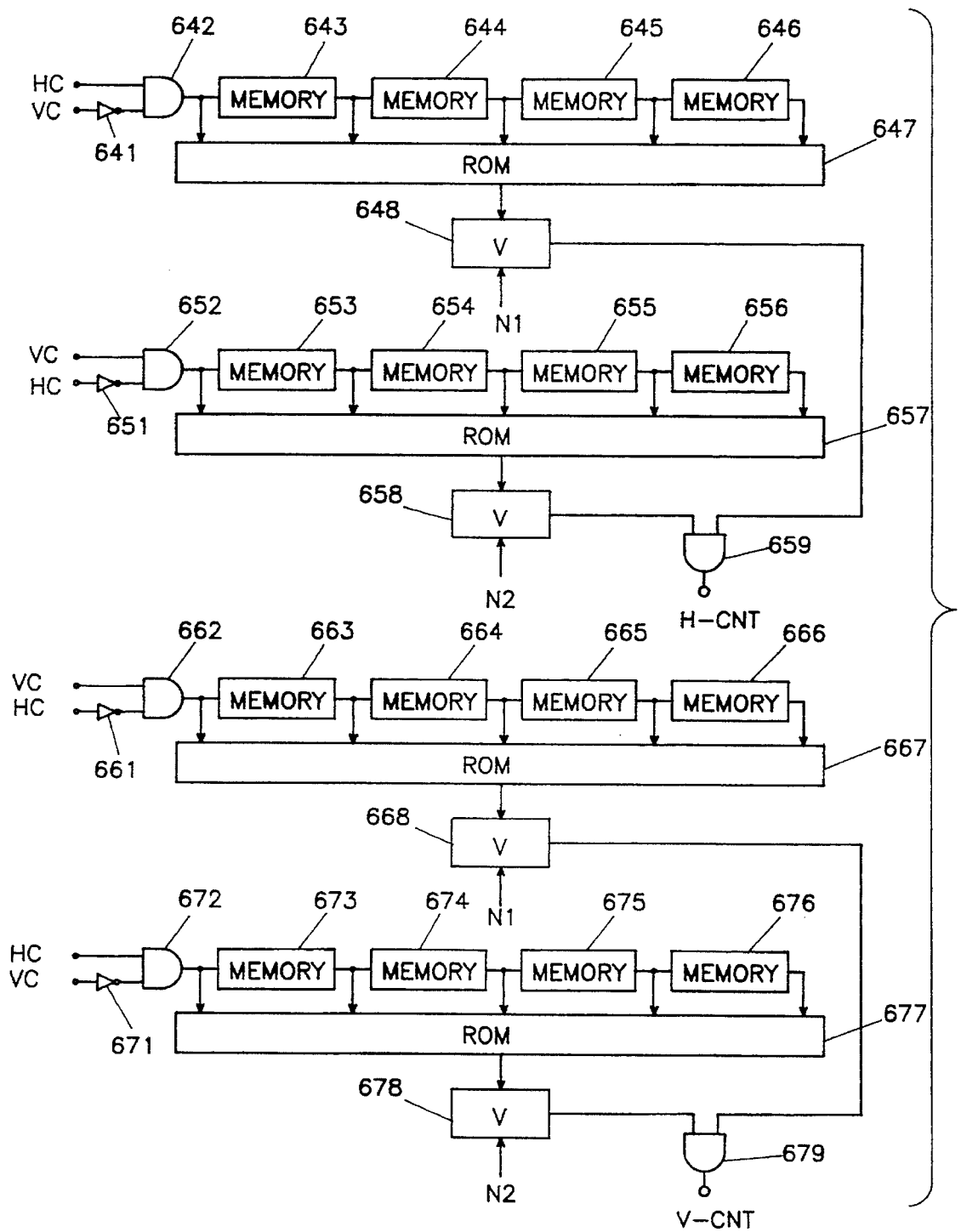
FIG. 12 is the detailed block diagram of a post-processor in FIG. 5.

Referring to FIG. 12, there is shown a detailed block diagram of the post-processor 15 in FIG. 5. As shown in this drawing, the post-processor 15 performs the step of obtaining a first logical product component (HC &/VC) and a second logical product component (/HC & VC) of the horizontal and vertical control signals HC and VC from the control signal generation circuit 14, the step of comparing the number of high levels of the first and second logical product components in a predetermined post-process window size with reference values N1 and N2, respectively, and the step of outputting the final horizontal control signal H-CNT if the number of the high levels of the first logical product component is greater than the reference value N1 and the number of the high levels of the second logical product component is smaller than the reference value N2 in accordance with the compared result.

The post-processor 15 also performs the step of obtaining a third logical product component (VC &/HC) and a fourth logical product component (/VC & HC) of the horizontal and vertical control signals HC and VC from the control signal generation circuit 14, the step of comparing the number of high levels of the third and fourth logical product components in the predetermined post-process window size with the reference values N1 and N2, respectively, and the step of outputting the final vertical control signal V-CNT if the number of the high levels of the third logical product component is greater than the reference value N1 and the number of the high levels of the fourth logical product component is smaller than the reference value N2 in accordance with the compared result.

To perform the above signal process, the post-processor 15 includes an inverter 641 for inverting the vertical control signal VC from the control signal generation circuit 14, an AND gate 642 for ANDing the horizontal control signal HC from the control signal generation circuit 14 and an output signal from the inverter 641, first to fourth memories 643–646 for sequentially storing an output signal from the AND gate 642, a first read only memory (ROM) 647 for inputting, as an address, the output signal from the AND gate 642 and output signals from the first to fourth memories 643–646 and outputting comparison information stored in its location corresponding to the inputted address, a first comparator 648 for comparing the comparison information from the first ROM 647 with the reference value N1, an inverter 651 for inverting the horizontal control signal HC from the control signal generation circuit 14, an AND gate 652 for ANDing the vertical control signal VC from the control signal generation circuit 14 and an output signal from the inverter 651, fifth to eighth memories 653–656 for sequentially storing an output signal from the AND gate 652, a second ROM 657 for inputting, as an address, the output signal from the AND gate 652 and output signals from the fifth to eighth memories 653–656 and outputting comparison information stored in its locations corresponding to the inputted address, a second comparator 658 for comparing the comparison information from the second ROM 657 with the reference value N2, and an AND gate 659 for ANDing output signals from the first and second comparators 648 and 658 to output the final horizontal control signal H-CNT.

The post-processor 15 also includes an inverter 661 for inverting the horizontal control signal HC from the control signal generation circuit 14, an AND gate 662 for ANDing the vertical control signal VC from the control signal generation circuit 14 and an output signal from the inverter 661, ninth to twelfth memories 663–666 for sequentially storing an output signal from the AND gate 662, a third ROM 667 for inputting, as an address, the output signal from the AND gate 662 and output signals from the ninth to twelfth memories 663–666 and outputting comparison information stored in its locations corresponding to the inputted address, a third comparator 668 for comparing the comparison information from the third ROM 667 with the reference value N1, an inverter 671 for inverting the vertical control signal VC from the control signal generation circuit 14, an AND gate 672 for ANDing the horizontal control signal HC from the control signal generation circuit 14 and an output signal from the inverter 671, thirteenth to sixteenth memories 673–676 for sequentially storing an output signal from the AND gate 672, a fourth ROM 677 for inputting, as an address, the output signal from the AND gate 672 and output signals from the thirteenth to sixteenth memories 673–676 and outputting comparison information stored in its locations corresponding to the inputted address, a fourth comparator 678 for comparing the comparison information from the fourth ROM 677 with the reference value N2, and an AND gate 679 for ANDing output signals from the third and fourth comparators 668 and 678 to output the final vertical control signal V-CNT.

The operation of the post-processor 15 with the above-mentioned construction in accordance with the present invention will hereinafter be described in detail with reference to FIGS. 13A and 13B which are views illustrating ROM data tables in accordance with the present invention.

The inverter 641 inverts the vertical control signal VC from the control signal generation circuit 14 and applies the inverted vertical control signal/VC to the AND gate 42, which also receives the horizontal control signal HC from the control signal generation circuit 14. Then, the AND gate 642 ANDs the inverted vertical control signal/VC from the inverter 641 and the horizontal control signal HC from the control signal generation circuit 14, so as to obtain the first logical product component (HC &/VC). The first logical product component (HC &/VC) from the AND gate 642 is sequentially stored by individual bits into the first to fourth memories 643–646, the stored bits being control signals for the post-process.

The inverter 651 inverts the horizontal control signal HC from the control signal generation circuit 14 and applies the inverted horizontal control signal/HC to the AND gate 652, which also receives the vertical control signal VC from the control signal generation circuit 14. Then, the AND gate 652 ANDs the inverted horizontal control signal/HC from the inverter 651 and the vertical control signal VC from the control signal generation circuit 14, so as to obtain the second logical product component (VC &/HC). The second logical product component (VC &/HC) from the AND gate 652 is sequentially stored by one bit into the fifth to eighth memories 653–656, the stored bits being control signals for the post-process.

The output signal from the AND gate 642 and the output signals from the first to fourth memories 643–646 are applied as the address to the first ROM 647 and the output signal from the AND gate 652 and the output signals from the fifth to eighth memories 653–656 are applied as the address to the second ROM 657.

As shown in FIGS. 13A and 13B, data DATA, DATA1 and DATA2 stored in the first ROM 647 represent the number of the high levels of the logical product component in the window size (5 in FIG. 12). Thus, upon receiving the address, the first ROM 647 outputs the number of the high levels of the logical product component stored in its location corresponding to the received address. The output data from the first ROM 647 is applied to the first comparator 648.

The first comparator 648 compares the output data from the first ROM 647 with the reference value N1. If the output data from the first ROM 647 is greater than the reference value N1, the first comparator 648 provides a high output. The output signal from the first comparator 648 is applied to the AND gate 659.

The data DATA, DATA1 and DATA2 stored in the second ROM 657 represent the number of the high levels of the logical product component in the window size (5 in FIG. 12), as shown in FIGS. 13A and 13B. Thus, upon receiving the address, the second ROM 657 outputs the number of the high levels of the logical product component stored in its location corresponding to the received address. The output data from the second ROM 657 is applied to the second comparator 658.

The second comparator 658 compares the output data from the second ROM 657 with the reference value N2. If the output data from the second ROM 657 is smaller than the reference value N2, the second comparator 658 provides a high output. The output signal from the second comparator 658 is applied to the AND gate 659.

As a result, the AND gate 659 outputs the horizontal control signal H-CNT of a high level under the condition that both the output signals from the first and second comparators 648 and 658 are high, namely, the number of the high levels of the first logical product component is greater than the reference value N1 and the number of the high levels of the second logical product component is smaller than the reference value N2.

The inverter 661 inverts the horizontal control signal HC from the control signal generation circuit 14 and applies the inverted horizontal control signal/HC to the AND gate 662, which also receives the vertical control signal VC from the control signal generation circuit 14. Then, the AND gate 662 ANDs the inverted horizontal control signal/HC from the inverter 661 and the vertical control signal VC from the control signal generation circuit 14, so as to obtain the third logical product component (VC &/HC). The third logical product component (VC &/HC) from the AND gate 662 is sequentially stored by one bit into the ninth to twelfth memories 663–666, the stored bits being control signals for the post-process.

The inverter 671 inverts the vertical control signal VC from the control signal generation circuit 14 and applies the inverted vertical control signal/VC to the AND gate 672, which also receives the horizontal control signal HC from the control signal generation circuit 14. Then, the AND gate 672 ANDs the inverted vertical control signal/VC from the inverter 671 and the horizontal control signal HC from the control signal generation circuit 14, so as to obtain the fourth logical product component (HC &/VC). The fourth logical product component (HC &/VC) from the AND gate 672 is sequentially stored by one bit into the thirteenth to sixteenth memories 673–676, the stored bits being control signals for the post-process.

The output signal from the AND gate 662 and the output signals from the ninth to twelfth memories 663–666 are applied as the address to the third ROM 667 and the output signal from the AND gate 672 and the output signals from the thirteenth to sixteenth memories 673–676 are applied as the address to the fourth ROM 677.

As shown in FIGS. 13A and 13B, the data DATA, DATA1 and DATA2 stored in the third ROM 667 represent the number of the high levels of the logical product component in the window size (5 in FIG. 12). Thus, upon receiving the address, the third ROM 667 outputs the number of the high levels of the logical product component stored in its location corresponding to the received address. The output data from the third ROM 667 is applied to the third comparator 668.

The third comparator 668 compares the output data from the third ROM 667 with the reference value N1. If the output data from the third ROM 667 is greater than the reference value N1, the third comparator 668 provides a high output. The output signal from the third comparator 668 is applied to the AND gate 679.

The data DATA, DATA1 and DATA2 stored in the fourth ROM 677 represent the number of the high levels of the logical product component in the window size (5 in FIG. 12), as shown in FIGS. 13A and 13B. Thus, upon receiving the address, the fourth ROM 677 outputs the number of the high levels of the logical product component stored in its location corresponding to the received address. The output data from the fourth ROM 677 is applied to the fourth comparator 678.

The fourth comparator 678 compares the output data from the fourth ROM 677 with the reference value N2. If the output data from the fourth ROM 677 is smaller than the reference value N2, the fourth comparator 678 provides a high output. The output signal from the fourth comparator 678 is applied to the AND gate 679.

Subsequently, the AND gate 679 outputs the vertical control signal V-CNT of a high level under the condition that both the output signals from the third and fourth comparators 668 and 678 are high, namely, the number of the high levels of the third logical product component is greater than the reference value N1 and the number of the high levels of the fourth logical product component is smaller than the reference value N2.

Noticeably, the window size is set by adjusting the number of the first to sixteenth memories and the capacity of the first to fourth ROMs.

The ROM data tables for the post-processor 15 will hereinafter be mentioned in more detail with reference to FIGS. 13A and 13B.

In FIG. 13A, the data of each address represents the number of logical "1"s of the corresponding address. As a result, each ROM outputs the number of the high control signals in the post-process window.

FIG. 13B is a simplified one of FIG. 13A, in which the output of each comparator is applied to the ROM in the case where the reference values N1 and N2 are determined. In FIG. 13B, the data are under the condition that the post-process window size is "5" and the reference values N1 and N2 are "3" and "1", respectively.

In an alternative embodiment in which the data of FIG. 13B are used, the second and fourth ROMs 657 and 677 and the second and fourth comparators 658 and 678 may be removed and first and second NOR gates (not shown) may be used instead, under the condition that the reference value N1 is set to a predetermined value and the reference value N2 is set to "0". The first NOR gate NORes the output signals from the fifth to eighth memories 653–656 and applies the NORed result to the AND gate 659. The second NOR gate NORes the output signals from the thirteenth to sixteenth memories 673–676 and applies the NORed result to the AND gate 679.

In the alternative embodiment with the above-mentioned construction, the first NOR gate feeds a high output to the AND gate 659 if the output signals from the fifth to eighth memories 653–656 are all low. The second NOR gate feeds a high output to the AND gate 679 if the output signals from the thirteenth to sixteenth memories 673–676 are all low. Then, the AND gate 659 ANDs the output signal from the first NOR gate with the output signal from the first comparator 648 to output the horizontal control signal H-CNT. The AND gate 679 ANDs the output signal from the second NOR gate with the output signal from the third comparator 668 to output the vertical control signal V-CNT.

As seen from FIG. 13B, the first or third ROM 647 or 667 provides a high output (logical "1") when the number of the high control signals in the window size is greater than or equal to 3. Also, the second or fourth ROM 657 or 677 provides a high output when the number of the high control signals in the window size is smaller than or equal to 1, whereas a low output (logical "0") when the number of the high control signals in the window size is greater than 1. Further, the comparators in FIG. 12 will be removed by storing the data of FIG. 13B into the ROMs, since the data is the compared result.

Figure 14:
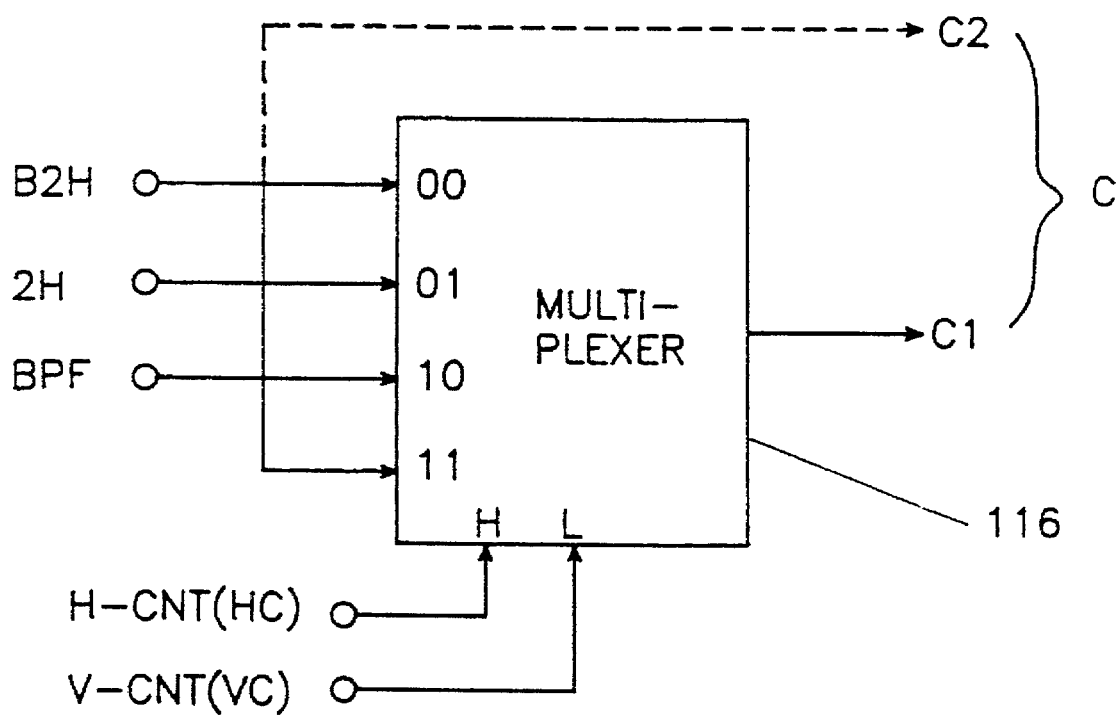
FIG. 14 is a detailed block diagram of the output selection unit shown in FIG. 5.

Referring to FIG. 14, there is shown a detailed block diagram of the output selection unit 16 in FIG. 5. As shown in this drawing, the output selection unit 16 includes a multiplexer 116 for selecting one of the line comb filtered color signal, the band pass filtered color signal and the B2H-filtered color signal from the color signal detection circuit 13 is response to the horizontal and vertical control signals from the control signal generation circuit 14 or the post-processor 15.

The operation of the output selection unit 16 with the above-mentioned construction in accordance with the present invention will hereinafter be described in detail.

Under the condition that the post-process is not performed, the horizontal and vertical control signals HC and VC from the control signal generation circuit 14 are applied to control terminals H and L of the multiplexer 116, respectively. On the contrary, under the condition that the post-process is performed, the horizontal and vertical control signals H-CNT and V-CNT from the post-processor 15 are applied to the control terminals H and L of the multiplexer 116, respectively.

The B2H-filtered color signal from the color signal detection circuit 13 is applied to an input terminal ('00') of the multiplexer 116, the line comb filtered color signal 2H therefrom is applied to an input terminal ('01') of the multiplexer 116 and the band pass filtered color signal BPF therefrom is applied to an input terminal ('10') of the multiplexer 116.

The multiplexer 116 outputs the B2H-filtered color signal when both the horizontal and vertical control signals inputted to the control terminals 5H and L thereof are low (logical "0"). The multiplexer 116 outputs the line comb filtered color signal 2H when the horizontal control signal is low and the vertical control signal is high (logical "1"). The multiplexer 116 outputs the band pass filtered color signal BPF when the horizontal control signal is high and the vertical control signal is low.

The output color signal C1 from the multiplexer 116 is applied to the subtracter 18, resulting in the separation of the luminance signal Y. Noticeably, the output color signal C1 from the multiplexer 116 or the B2H-filtered color signal C2 are applied as the final color signal C to the subtracter 18. The case of using the B2H-filtered color signal C2 as the final color signal C is desirable to reduce the cross color phenomenon, but has the disadvantage that the cross luminance phenomenon is significantly increased. For this reason, the output color signal C1 from the multiplexer 116 and the B2H-filtered color signal C2 may be selected appropriately according to the system.

As apparent from the above description, according to the present invention, the dot interference phenomenon of the video signal with the horizontal or vertical variation can be removed in the color TV system. Also, with the increase in the resolution of the luminance signal, it is possible to prevent the degradation in the picture quality which is present in the video signal with the three-line variation or only the luminance signal. Therefore, the present invention has the effect of enhancing the quality of high definition color TV receivers such as EDTV, IDTV and etc..

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for separating luminance and color signals from an input video signal, comprising:

color signal detection means for filtering the input video signal at horizontal, vertical and two-dimensional regions to detect respective color signals therefrom;

color signal generation means for discriminating horizontal, vertical and diagonal variations of the input video signal and generating a plurality of control signals in accordance with the discriminated result so that one of the color signals from said color signal detection means can be selected;

output selection means for selecting one of the color signals from said color signal detection means in response to the control signals from said control signal generation means;

delay matching means for delaying the input video signal to match its timing with that of the color signal from said output selection means; and subtraction means for subtracting the color signal from said output selection means from an output signal from said delay matching means to output the luminance signal; and post-processing means for maintaining the control signals from said control signal generation means consistent and outputting the resultant final control signals to said output selection means.

2. An apparatus for separating luminance and color signals from an input video signal, as set forth claim 1, wherein said control signal generation means includes:

a first control signal generator for discriminating the horizontal, vertical and diagonal variations of the input video signal in response to first to sixth horizontal difference signals and first to sixth vertical difference signals from said color signal detection means and generating horizontal and vertical selection control signals in accordance with the discriminated result;

a pattern signal generator for discriminating the horizontal, vertical and diagonal variations of the input video signal in response to the first to sixth horizontal difference signals and the first to sixth vertical difference signals from said color signal detection means and generating first to third horizontal control signals, first to third vertical control signals, first to ninth horizontal pattern signals and first to ninth vertical pattern signals in accordance with the discriminated result; and a second control signal generator for generating final horizontal and vertical control signals in response to the horizontal and vertical selection control signals from said first control signal generator and the first to third horizontal control signals, the first to third vertical control signals, the first to ninth horizontal pattern signals and the first to ninth vertical pattern signals from said pattern signal generator.

3. An apparatus for separating luminance and color signals from an input video signal, as set forth in claim 2, wherein said first control signal generator includes:

a first subtracter for subtracting the first and second horizontal difference signals from said difference signal detector from each other;

a second subtracter for subtracting the third and fourth horizontal difference signals from said difference signal detector from each other;

a third subtracter for subtracting the fifth and sixth horizontal difference signals from said difference signal detector from each other;

first to third absolute value calculators for obtaining absolute values of output signals from said first to third subtracters, respectively;

a first maximum value selector for selecting a maximum one of output values from said first to third absolute value calculators;

a first comparator for comparing an output value from said first maximum value selector with a first reference value and outputting the horizontal selection control signal in accordance with the compared result;

a fourth subtracter for subtracting the first and second vertical difference signals from said difference signal detector from each other;

a fifth subtracter for subtracting the third and fourth vertical difference signals from said difference signal detector from each other;

a sixth subtracter for subtracting the fifth and sixth vertical difference signals from said difference signal detector from each other;

fourth to sixth absolute value calculators for obtaining absolute values of output signals from said fourth to sixth subtracters, respectively;

a second maximum value selector for selecting a maximum one of output values from said fourth to sixth absolute value calculators; and a second comparator for comparing an output value from said second maximum value selector with a second reference value and outputting the vertical selection control signal in accordance with the compared result.

4. An apparatus for separating luminance and color signals from an input video signal, as set forth in claim 2, wherein said pattern signal generator includes:

first to twelfth absolute value calculators for obtaining absolute values of the first to sixth horizontal difference signals and the first to sixth vertical difference signals from said difference signal detector, respectively;

first to sixth comparators for comparing output values from said first to sixth absolute value calculators with a horizontal reference value, respectively;

seventh to twelfth comparators for comparing output values from said seventh to twelfth absolute value calculators with a vertical reference value, respectively;

a first logical device group for logically combining the first and second horizontal difference signals from said difference signal detector with output signals from said first and second comparators to output the first to third horizontal pattern signals;

a second logical device group for logically combining the third and fourth horizontal difference signals from said difference signal detector with output signals from said third and fourth comparators to output the fourth to sixth horizontal pattern signals;

a third logical device group for logically combining the fifth and sixth horizontal difference signals from said difference signal detector with output signals from said fifth and sixth comparators to output the seventh to ninth horizontal pattern signals;

a fourth logical device group for logically combining the first and second vertical difference signals from said difference signal detector with output signals from said seventh and eighth comparators to output the first to third vertical pattern signals;

a fifth logical device group for logically combining the third and fourth vertical difference signals from said difference signal detector with output signals from said ninth and tenth comparators to output the fourth to sixth vertical pattern signals;

a sixth logical device group for logically combining the fifth and sixth vertical difference signals from said difference signal detector with output signals from said eleventh and twelfth comparators to output the seventh to ninth vertical pattern signals; p'a first OR gate for ORing the first to third horizontal pattern signals from said first logical device group to output the first horizontal control signal;

a second OR gate for ORing the fourth to sixth horizontal pattern signals from said second logical device group to output the second horizontal control signal;

a third OR gate for ORing the seventh to ninth horizontal pattern signals from said third logical device group to output the third horizontal control signal;

a fourth OR gate for ORing the first to third vertical pattern signals from said fourth logical device group to output the first vertical control signal;

a fifth OR gate for ORing the fourth to sixth vertical pattern signals from said fifth logical device group to output the second vertical control signal; and a sixth OR gate for ORing the seventh to ninth vertical pattern signals from said sixth logical device group to output the third vertical control signal.

5. An apparatus for separating luminance and color signals from an input video signal, as set forth in claim 2, wherein said second control signal generator includes:

a first logical device group for logically combining the first to ninth horizontal pattern signals from said pattern signal generator;

a first OR gate for ORing output signals from said first logical device group;

a first AND gate for ANDing the first to third horizontal control signals from said pattern signal generator;

a second AND gate for ANDing an output signal from said first OR gate, an output signal from said first AND gate, the horizontal selection control signal from said first control signal generator and an inverted one of the vertical selection control signal from said first control signal generator to output the final horizontal control signal;

a second logical device group for logically combining the first to ninth vertical pattern signals from said pattern signal generator;

a second OR gate for ORing output signals from said second logical device group;

a third AND gate for ANDing the first to third vertical control signals from said pattern signal generator; and a fourth AND gate for ANDing an output signal from said second OR gate, an output signal from said third AND gate, the vertical selection control signal from said first control signal generator and an inverted one of the horizontal selection control signal from said first control signal generator to output the final vertical control signal.

6. An apparatus for separating luminance and color signals from an input video signal, as set forth in claim 1, wherein said post-processing means includes:

first and second AND gates for ANDing a horizontal control signal from said control signal generation means and an inverted one of a vertical control signal from said control signal generation means, respectively;

third and fourth AND gates for ANDing the vertical control signal from said control signal generation means and an inverted one of the horizontal control signal from said control signal generation means, respectively;

first to fourth memories for sequentially storing an output signal from said first AND gate;

fifth to eighth memories for sequentially storing an output signal from said third AND gate;

ninth to twelfth memories for sequentially storing an output signal from said fourth AND gate;

thirteenth to sixteenth memories for sequentially storing an output signal from said second AND gate;

a first ROM for inputting, as an address, the output signal from said first AND gate and output signals from said first to fourth memories and outputting comparison information stored in its location corresponding to the inputted address;

a second ROM for inputting, as an address, the output signal from said third AND gate and output signals from said fifth to eighth memories and outputting comparison information stored in its location corresponding to the inputted address;

a third ROM for inputting, as an address, the output signal from said fourth AND gate and output signals from said ninth to twelfth memories and outputting comparison information stored in its location corresponding to the inputted address;

a fourth ROM for inputting, as an address, the output signal from said second AND gate and output signals from said thirteenth to sixteenth memories and outputting comparison information stored in its location corresponding to the inputted address;

a first comparator for comparing an output signal from said first ROM with a first reference value;

a second comparator for comparing an output signal from said second ROM with a second reference value;

a third comparator for comparing an output signal from said third ROM with the first reference value;

a fourth comparator for comparing an output signal from said fourth ROM with the second reference value;

a fifth. AND gate for ANDing output signals from said first and second comparators to output a final horizontal control signal; and a sixth AND gate for ANDing output signals from said third and fourth comparators to output a final vertical control signal.

7. An apparatus for separating luminance and color signals from an input video signal, as set forth in claim 6, wherein the final horizontal control signal is high in level when the number of high components of the output signal from said first AND gate is greater than the first reference value and the number of high components of the output signal from said third AND gate is smaller than the second reference value and the final vertical control signal is high in level when the number of high components of the output signal from said fourth AND gate is greater than the first reference value and the number of high components of the output signal from said second AND gate is smaller than the second reference value.

8. An apparatus for separating luminance and color signals from an input video signal, as set forth in claim 1, wherein said post-processing means includes:

first and second AND gates for ANDing a horizontal control signal from said control signal generation means and an inverted one of a vertical control signal from said control signal generation means, respectively;

third and fourth AND gates for ANDing the vertical control signal from said control signal generation means and an inverted one of the horizontal control signal from said control signal generation means, respectively;

first to fourth memories for sequentially storing an output signal from said first AND gate;

fifth to eighth memories for sequentially storing an output signal from said third AND gate;

ninth to twelfth memories for sequentially storing an output signal from said fourth AND gate;

thirteenth to sixteenth memories for sequentially storing an output signal from said second AND gate;

a first ROM for inputting, as an address, the output signal from said first AND gate and output signals from said first to fourth memories and outputting comparison information stored in its location corresponding to the inputted address;

a second ROM for inputting, as an address, the output signal from said fourth AND gate and output signals from said ninth to twelfth memories and outputting comparison information stored in its location corresponding to the inputted address;

a first comparator for comparing an output signal from said first ROM with a first reference value;

a second comparator for comparing an output signal from said second ROM with the first reference value;

a first NOR gate for NORing the output signals from the fifth to eighth memories;

a fifth AND gate for ANDing output signals from said first comparator and said first NOR gate to output a final horizontal control signal;

a second NOR gate for NORing the output signals from the thirteenth to sixteenth memories; and a sixth AND gate for ANDing output signals from said second comparator and said second NOR gate to output a final vertical control signal.

9. An apparatus for separating luminance and color signals from an input video signal, comprising:

color signal detection means for filtering the input video signal at horizontal, vertical and two-dimensional regions to detect respective color signals therefrom;

color signal generation means for discriminating horizontal, vertical and diagonal variations of the input video signal and generating a plurality of control signals in accordance with the discriminated result so that one of the color signals from said color signal detection means can be selected;

output selection means for selecting one of the color signals from said color signal detection means in response to the control signals from said control signal generation means;

delay matching means for delaying the input video signal to match its timing with that of the color signal from said output selection means; and subtraction means for subtracting the color signal from said output selection means from an output signal from said delay matching means to output the luminance signal;

wherein said color signal detection means includes
a difference signal detector for performing line and sample delay and subtraction processes with respect to the input video signal to output first to sixth horizontal difference signals and first to sixth vertical difference signals, each of said horizontal and vertical difference signals representing a difference between adjacent two samples of the input video signal; and
a color signal detector for performing addition, operational-amplification and delay-matching processes with respect to the third and fourth horizontal difference signals and the third and fourth vertical difference signals from said difference signal detector to output a band pass filtered color signal, a line comb filtered color signal, and a line comb filtered and band pass filtered color signal.

10. An apparatus for separating luminance and color signals from an input video signal, as set forth in claim 9, wherein said difference signal detector includes:

an analog/digital converter for converting the input video signal into a digital video signal;

first and second horizontal delays for sequentially delaying an output signal from said analog/digital converter by one line;

first and second sample delays for sequentially delaying the output signal from said analog/digital converter by two samples;

third and fourth sample delays for sequentially delaying an output signal from said first horizontal delay by two samples;

fifth and sixth sample delays for sequentially delaying an output signal from said second horizontal delay by two samples;

a first subtracter for subtracting the output signal from said analog/digital converter from the output signal from said first horizontal delay to output the first vertical difference signal;

a second subtracter for subtracting the output signal from said second horizontal delay from the output signal from said first horizontal delay to output the second vertical difference signal;

a third subtracter for subtracting an output signal from said first sample delay from an output signal from said third sample delay to output the third vertical difference signal;

a fourth subtracter for subtracting an output signal from said fifth sample delay from the output signal from said third sample delay to output the fourth vertical difference signal;

a fifth subtracter for subtracting an output signal from said second sample delay from an output signal from said fourth sample delay to output the fifth vertical difference signal;

a sixth subtracter for subtracting an output signal from said sixth sample delay from the output signal from said fourth sample delay to output the sixth vertical difference signal;

a seventh subtracter for subtracting the output signal from said analog/digital converter from the output signal from said first sample delay to output the first horizontal difference signal;

an eighth subtracter for subtracting the output signal from said second sample delay from the output signal from said first sample delay to output the second horizontal difference signal;

a ninth subtracter for subtracting the output signal from said first horizontal delay from the output signal from said third sample delay to output the third horizontal difference signal;

a tenth subtracter for subtracting the output signal from said fourth sample delay from the output signal from said third sample delay to output the fourth horizontal difference signal;

an eleventh subtracter for subtracting the output signal from said second horizontal delay from the output signal from said fifth sample delay to output the fifth horizontal difference signal; and a twelfth subtracter for subtracting the output signal from said sixth sample delay from the output signal from said fifth sample delay to output the sixth horizontal difference signal; and wherein said color signal detector includes:

a first adder for adding the third and fourth horizontal difference signals from said difference signal detector;

a first amplifier for operational-amplifying an output signal from said first adder by ¼ to output the band pass filtered color signal;

a second adder for adding the third and fourth vertical difference signals from said difference signal detector;

a second amplifier for operational-amplifying an output signal from said first adder by ¼ to output the line comb filtered color signal;

a band pass filter for band pass filtering an output signal from said second amplifier to output the line comb filtered and band pass filtered color signal;

a first delay matching unit for delaying an output signal from said first amplifier to match its timing with that of an output signal from said band pass filter; and a second delay matching unit for delaying the output signal from said second amplifier to match its timing with that of the output signal from said band pass filter.

11. An apparatus for separating luminance and color signals from an input video signal, comprising:

color signal detection means for filtering the input video signal at horizontal, vertical and two-dimensional regions to detect respective color signals therefrom;

color signal generation means for discriminating horizontal, vertical, and diagonal variations of the input video signal and generating a plurality of control signals in accordance with the discriminated result so that one of the color signals from said color signal detection means can be selected;

output selection means, for selecting one of the color signals from said color signal detection means in response to the control signals from said control signal generation means, including a multiplexer for selecting one of a line comb filtered color signal, a band pass filtered color signal, and a line comb filtered and a band pass filtered color signal from said color signal detection means in response to horizontal and vertical control signals from said control signal generation means;

delay matching means for delaying the input video signal to match its timing with that of the color signal from said output selection means; and subtraction means for subtracting the color signal from said output selection means from an output signal from said delay matching means to output the luminance signal.

12. A method of separating luminance and color signals from an input video signal, comprising the steps of:

(a) delaying horizontally and vertically the input video signal to obtain adjacent samples thereof;

(b) performing operational and comparative-processing with respect to the samples obtained at said step (a) to discriminate horizontal, vertical and diagonal variations of the input video signal;

(c) line comb filtering, band pass filtering, and line comb filtering and band pass filtering the samples obtained at said step (a), respectively, to detect a line comb filtered color signal, a band pass filtered color signal, and a line comb filtered and band pass filtered color signal from the input video signal;

(d) selecting one of the line comb filtered color signal, the band pass filtered color signal, and the line comb filtered and band pass filtered color signal detected at said step (c) in accordance with the result discriminated at said step (b); and (e) subtracting the color signal selected at said step (d) from the input video signal to detect the luminance signal;

wherein said step (d) includes the sub-step of:

selecting the line comb filtered color signal detected at said step (c) if the horizontal variation of the input video signal is discriminated at said step (b), selecting the band pass filtered color signal detected at said step (c) if the vertical variation of the input video signal is discriminated at said step (b), and selecting the line comb filtered and band pass filtered color signal detected at said step (c) if the diagonal variation of the input video signal is discriminated at said step (b).

13. A method of separating luminance and color signals from an input video signal, as set forth in claim 12, wherein said step (b) includes the steps of:

obtaining a difference signal of each pair of the adjacent samples of the input video signal;

comparing the obtained difference signals with a first reference value, logically combining the compared results and discriminating variation patterns of the input video signal in accordance with the logically combined result;

obtaining absolute values of the obtained difference signals and selecting a maximum one of the obtained absolute values; and comparing the selected maximum value with a second reference value, logically combining the discriminated variation patterns of the input video signal in accordance with the compared result and discriminating the horizontal, vertical and diagonal variations of the input video signal in accordance with the logically combined result.

14. An apparatus for separating luminance and color signals from an input video signal, comprising the steps of:

(a) means for delaying horizontally and vertically the input video signal to obtain adjacent samples thereof;

(b) means for performing operational and comparative-processes with respect to the samples obtained at said step (a) to discriminate horizontal, vertical and diagonal variations of the input video signal;

(c) means for line comb filtering, band pass filtering, and line comb filtering and band pass filtering the samples obtained at said step (a), respectively, to detect a line comb filtered color signal, a band pass filtered color signal, and a line comb filtered and band pass filtered color signal from the input video signal;

(d) means for selecting one of the line comb filtered color signal, the band pass filtered color signal and the line comb filtered and band pass filtered color signal detected at said step (c) in accordance with the result discriminated at said step (b); and (e) means for subtracting the color signal selected at said step (d) from the input video signal to detect the luminance signal;

wherein said means for selecting selects the line comb filtered color signal if the horizontal variation of the input video signal is discriminated; the band pass filtered color signal if the vertical variation of the input video signal is discriminated; or the line comb filtered and band pass filtered color signal if the diagonal variation of the input video signal is discriminated.

* * * * *